(12) United States Patent
Hough et al.

(10) Patent No.: US 10,564,831 B2
(45) Date of Patent: Feb. 18, 2020

(54) VISION CORRECTION SYSTEM, METHOD AND GRAPHICAL USER INTERFACE FOR IMPLEMENTATION ON ELECTRONIC DEVICES HAVING A GRAPHICAL DISPLAY

(71) Applicant: EVOLUTION OPTIKS LIMITED, Bridgetown (BB)

(72) Inventors: Nathan L. Hough, St. Michael (BB); Christopher J. S. Hough, St. Michael (BB); Jennifer K. Sharpe, St. Michael (BB); Ryan M. Hough, St. Michael (BB); Luke A. Vigeant, Ontario (CA)

(73) Assignee: EVOLUTION OPTIKS LIMITED, Bridgetown (BB)

( * ) Notice: Subject to any disclaimer, the term of this patent is extended or adjusted under 35 U.S.C. 154(b) by 0 days.

(21) Appl. No.: 15/246,255

(22) Filed: Aug. 24, 2016

(65) Prior Publication Data

US 2017/0060399 A1    Mar. 2, 2017

(30) Foreign Application Priority Data

Aug. 25, 2015  (CA) .................................... 2901477

(51) Int. Cl.
*G06F 3/048* (2013.01)
*G06F 3/0484* (2013.01)
(Continued)

(52) U.S. Cl.
CPC ......... *G06F 3/04847* (2013.01); *G02B 27/02* (2013.01); *G02B 27/2214* (2013.01); *G06F 3/0482* (2013.01); *G06F 3/14* (2013.01); *G06F 3/147* (2013.01); *G09G 5/003* (2013.01); *G09G 5/30* (2013.01); *H04L 67/04* (2013.01); *H04L 67/10* (2013.01); *H04L 67/125* (2013.01); *H04L 67/306* (2013.01); *G06T 1/0007* (2013.01);
(Continued)

(58) Field of Classification Search
CPC .. G06F 3/0487; G06F 3/04847; G06F 3/0482; G06F 3/14
See application file for complete search history.

(56) References Cited

U.S. PATENT DOCUMENTS 6,192,341 B1   2/2001  Becker et al.
6,386,707 B1   5/2002  Pellicano
(Continued)

FOREIGN PATENT DOCUMENTS

AU    2015100739       7/2015
DE   102004038822 A1   3/2006
(Continued)

OTHER PUBLICATIONS

"Eyeglasses-free Display: Towards Correcting Visual Aberrations with Computational Light Field Displays", by Huang et al., taken from http://web.media.mit.edu/~gordonw/VisionCorrectingDisplay/, published Aug. 2, 2014, pp. 1-15.*
(Continued)

*Primary Examiner* — William L Bashore
*Assistant Examiner* — Gregory A Distefano
(74) *Attorney, Agent, or Firm* — Knobbe, Martens, Olson & Bear, LLP

(57) ABSTRACT

Described are various embodiments of an electronic device having an adjustable graphical display, and a vision correction system, method and graphical user interface therefor.

25 Claims, 18 Drawing Sheets

(51) Int. Cl.
*H04L 29/08* (2006.01)
*G02B 27/22* (2018.01)
*G06F 3/147* (2006.01)
*G09G 5/00* (2006.01)
*G02B 27/02* (2006.01)
*G06F 3/0482* (2013.01)
*G06F 3/14* (2006.01)
*G09G 5/30* (2006.01)
*G06T 1/00* (2006.01)
*G06T 5/00* (2006.01)

(52) U.S. Cl.
CPC ........ *G06T 5/00* (2013.01); *G09G 2320/0261* (2013.01); *G09G 2320/0606* (2013.01); *G09G 2320/0626* (2013.01); *G09G 2320/0693* (2013.01); *G09G 2340/14* (2013.01); *G09G 2354/00* (2013.01); *G09G 2370/02* (2013.01); *G09G 2380/08* (2013.01); *H04L 67/12* (2013.01)

(56) References Cited

U.S. PATENT DOCUMENTS

| | | | |
|---|---|---|---|
| 6,543,898 | B1 | 4/2003 | Griffin et al. |
| 6,784,905 | B2 | 8/2004 | Brown et al. |
| 6,809,704 | B2 | 10/2004 | Kulas |
| 6,876,758 | B1 | 4/2005 | Polat et al. |
| 7,062,547 | B2 | 6/2006 | Brown et al. |
| 7,517,086 | B1 | 4/2009 | Kürkure |
| 7,866,817 | B2 | 1/2011 | Polat |
| 7,891,813 | B2 | 2/2011 | Ogilvie |
| 8,089,512 | B2 | 1/2012 | Okabe et al. |
| 8,098,440 | B2 | 1/2012 | Jethmalani et al. |
| 8,231,220 | B2 | 7/2012 | Baranton |
| 8,322,857 | B2 | 12/2012 | Barbur et al. |
| 8,540,375 | B2 | 9/2013 | Destain |
| 8,717,254 | B1* | 5/2014 | Nave ............ G09G 3/003 345/7 |
| 8,798,317 | B2 | 8/2014 | Wu |
| 8,823,742 | B2 | 9/2014 | Kweon |
| 8,967,809 | B2 | 3/2015 | Kirschen et al. |
| 9,010,929 | B2 | 4/2015 | Lewis |
| 9,041,833 | B2 | 5/2015 | Hatakeyama |
| 9,052,502 | B2 | 6/2015 | Caldeira et al. |
| 9,104,233 | B2 | 8/2015 | Alberth |
| 9,159,299 | B2 | 10/2015 | Lee |
| 9,177,355 | B1 | 11/2015 | Buchheit |
| 9,183,806 | B2 | 11/2015 | Felt |
| 10,247,941 | B2 | 4/2019 | Fürsich |
| 2006/0119705 | A1 | 6/2006 | Liao |
| 2008/0309764 | A1 | 12/2008 | Kubota et al. |
| 2011/0019056 | A1 | 1/2011 | Hirsch et al. |
| 2011/0122144 | A1 | 5/2011 | Gabay |
| 2011/0157180 | A1* | 6/2011 | Burger ............ A61B 3/0041 345/428 |
| 2012/0254779 | A1 | 10/2012 | Ollivierre et al. |
| 2012/0262477 | A1* | 10/2012 | Buchheit ............ G09G 5/00 345/619 |
| 2013/0027384 | A1 | 1/2013 | Ferris |
| 2013/0096820 | A1 | 4/2013 | Agnew |
| 2013/0120390 | A1 | 5/2013 | Marchand et al. |
| 2013/0222652 | A1 | 8/2013 | Akeley et al. |
| 2014/0055692 | A1* | 2/2014 | Kroll ............ G02F 1/1347 349/15 |
| 2014/0063332 | A1 | 3/2014 | Miyawaki |
| 2014/0118354 | A1 | 5/2014 | Pais et al. |
| 2014/0137054 | A1 | 5/2014 | Gandhi et al. |
| 2014/0200079 | A1* | 7/2014 | Bathiche ............ A63F 13/00 463/32 |
| 2014/0267284 | A1 | 9/2014 | Blanche et al. |
| 2014/0282285 | A1 | 9/2014 | Sadhvani et al. |
| 2014/0327750 | A1 | 11/2014 | Malachowsky et al. |
| 2014/0327771 | A1* | 11/2014 | Malachowsky ........ H04N 7/18 348/148 |
| 2015/0049390 | A1 | 2/2015 | Lanman et al. |
| 2015/0234187 | A1 | 8/2015 | Lee |
| 2015/0234188 | A1 | 8/2015 | Lee |
| 2015/0336511 | A1 | 11/2015 | Ukeda |
| 2016/0042501 | A1 | 2/2016 | Huang et al. |
| 2016/0103419 | A1 | 4/2016 | Callagy et al. |
| 2016/0134815 | A1 | 5/2016 | Ishiguro et al. |
| 2016/0306390 | A1 | 10/2016 | Vertegaal et al. |
| 2017/0060399 | A1 | 3/2017 | Hough et al. |
| 2017/0227781 | A1 | 8/2017 | Banerjee et al. |
| 2017/0302913 | A1 | 10/2017 | Tonar et al. |
| 2017/0307898 | A1 | 10/2017 | Vdovin et al. |
| 2017/0365189 | A1 | 12/2017 | Halpin et al. |
| 2018/0252935 | A1 | 9/2018 | Vertegaal et al. |
| 2018/0290593 | A1 | 10/2018 | Cho |

FOREIGN PATENT DOCUMENTS

| | | |
|---|---|---|
| EP | 2127949 A1 | 12/2009 |
| EP | 1509121 B1 | 9/2012 |
| WO | 2011156721 A1 | 12/2011 |
| WO | 2013166570 A1 | 11/2013 |
| WO | 2014174168 A1 | 10/2014 |
| WO | 2014197338 A2 | 12/2014 |
| WO | 2018092989 A1 | 5/2018 |
| WO | 2018129310 A1 | 7/2018 |

OTHER PUBLICATIONS

International Search Report for International Application No. PCT/CA2016/051006 dated Sep. 30, 2016 in 5 pages.

Written Opinion of the International Searching Authority received in International Application No. PCT/CA2016/051006 dated Sep. 30, 2016 in 9 pages.

Huang, F.C., "A Computational Light Field Display for Correcting Visual Aberrations," Technical Report No. UCB/EECS-2013-206, Electrical Engineering and Computer Sciences University of California at Berkeley, available at http://www.eecs.berkeley.edu/Pubs/TechRpts/2013/EECS-2013-206.html, Dec. 15, 2013 (119 pages).

Huang, F.C. et al., "Eyeglasses-Free Display: Towards Correcting Visual Aberrations With Computational Light Field Displays," ACM Transactions on Graphics (TOG)—Proceedings of ACM SIGGRAPH 2014, vol. 33, Issue 4, Article No. 59, Jul. 2014 (12 pages).

Agus M. et al., "GPU Accelerated Direct Volume Rendering on an Interactive Light Field Display", EUROGRAPHICS 2008, vol. 27, No. 2, 2008.

Burnett T., "FoVI3D Extreme Multi-view Rendering for Light-field Displays", GTC 2018 (GPU Technology Conference), Silicon Valley, 2018.

Halle M., "Autostereoscopic displays and computer graphics", Computer Graphics, ACM SIGGRAPH, 31(2), May 1997, pp. 58-62.

Masia B. et al., "A survey on computational displays: Pushing the boundaries of optics, computation, and perception", Computer & Graphics, vol. 37, 2013, pp. 1012-1038.

Wetzstein, G. et al., "Tensor Displays: Compressive Light Field Synthesis using Multilayer Displays with Directional Backlighting", https://web.media.mit.edu/~gordonw/TensorDisplays/TensorDisplays.pdf.

Fattal, D. et al., A Multi-Directional Backlight fora Wide-Angle, Glasses-Free Three-Dimensional Display, Nature, Mar. 21, 2013, pp. 348-351, vol. 495.

* cited by examiner

VISION CORRECTION SYSTEM, METHOD AND GRAPHICAL USER INTERFACE FOR IMPLEMENTATION ON ELECTRONIC DEVICES HAVING A GRAPHICAL DISPLAY

CROSS REFERENCE TO RELATED APPLICATION

This application claims the benefit of priority to Canadian Patent Application No. 2,901,477, which was filed Aug. 25, 2015, and is incorporated herein by reference in its entirety and for all purposes.

FIELD OF THE DISCLOSURE

The present disclosure relates to electronic devices having a graphical display, and in particular, to a vision correction system, method and graphical user interface for implementation on such electronic devices.

BACKGROUND

The operating systems of current electronic devices having graphical displays offer certain "Accessibility" features built into the software of the device to attempt to provide users with reduced vision the ability to read and view content on the electronic device. Specifically, current accessibility options include the ability to invert images, increase the image size, adjust brightness and contrast settings, bold text, view the device display only in grey, and for those with legal blindness, the use of speech technology.

These techniques focus on the limited ability of software to manipulate display images through conventional image manipulation, with limited success. Other techniques, as reported for example in Fu-Chung Huang, Gordon Wetzstein, Brian A. Barsky, and Ramesh Raskar. "Eyeglasses-free Display: Towards Correcting Visual Aberrations with Computational Light Field Displays". *ACM Transaction on Graphics*, xx:0, August 2014, the entire contents of which are hereby incorporated herein by reference, have resulted either in a low-contrast image, a low-resolution image, or both. In any event, current techniques have thus far failed to provide a reliable solution for electronic device users having reduced visual acuity and who may wish to interact with their device's graphical display without the use of corrective eyewear, for example.

Furthermore, current techniques generally involve device-specific implementations based on device-resident image adjustment controls and parameters requiring direct user configuration.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for a vision correction system, method and graphical user interface for implementation on electronic devices having a graphical display, that overcome some of the drawbacks of known techniques, or at least, provide a useful alternative thereto. Some aspects of disclosure provide embodiments of such systems, methods, GUIs and devices.

In accordance with one aspect, there is provided an electronic device for use by a prescribed user having reduced visual acuity, the device comprising: a digital display; a hardware processor; and a computer-readable medium having statements and instructions stored thereon for execution by said hardware processor in correcting an output image to be rendered by said digital display in accordance with a designated image correction, wherein said image correction function receives as input at least one designated user-specific vision correction parameter selected from a plurality of available correction parameters to correspond with the reduced visual acuity of the user and thereby output a correspondingly corrected output image; wherein output of said correspondingly corrected output image via said digital display at least partially compensates for the user's reduced visual acuity.

In one embodiment, said digital display comprises a light-field display having a digital output display screen and a light-field display optics layered thereon and defined by at least one light-field optics parameter, and wherein said image correction function comprises an image pre-filtering function that receives as input said at least one light-field optics parameter and said at least one designated user-specific vision correction parameter to output said correspondingly corrected output image via said light-field display. In one such embodiment, the light-field display optics comprises a pinhole mask forming a parallax barrier light-field display. In another such embodiment, the light-field display optics comprises a lenslet array.

In one embodiment, said computer-readable medium has further statements and instructions stored thereon for execution by said hardware processor to implement and render an interactive graphical user interface (GUI) on said display, wherein said interactive GUI incorporates a dynamic vision correction scaling function that dynamically adjusts said at least one vision correction parameter in real-time in response to a designated user interaction therewith via said GUI.

In one such embodiment, said dynamic vision correction scaling function comprises a graphically rendered scaling function and wherein said designated user interaction comprises a continuous slide motion operation, and wherein said GUI is configured to capture and translate a user's given continuous slide motion operation to a corresponding adjustment to said vision correction parameter scalable with a degree of said user's given slide motion operation. In one such embodiment, said graphically rendered scaling function comprises a substantially circular graphical scale and wherein said continuous slide motion operation consists of a substantially circular motion on said substantially circular graphical scale. In another such embodiment, said light-field display comprises a touch-sensitive display and wherein said designated user interaction comprises a recognizable touch-activated gesture on said touch-sensitive display.

In one embodiment, the electronic device further comprises a communication interface operable to communicate over a network with a network-accessible vision correction resource having stored in association therewith said plurality of available correction parameters and a user profile associated with the user; wherein said user profile has stored in association therewith said at least one designated vision correction parameter; and wherein identification of said user profile is communicated by the electronic device to said network-accessible resource via said communication interface to access said at least one designated vision correction parameter therefrom. In one such embodiment, the electronic device further comprises statements and instructions that, when executed by said hardware processor, render a user login interface that receives as input user profile credentials and relays said user credentials to said network-accessible vision correction resource to access said at least one designated vision correction parameter therefrom. In another such embodiment, a given user profile is rendered accessible in response to a corresponding user login via two or more distinct electronic devices. In another such embodiment, said at least one designated vision correction parameter is automatically calculated by a hardware processor associated with said network-accessible resource as a function of at least one user visual acuity factor input by the user via the electronic device and communicated to the network-accessible resource via said communication interface for storage against said user profile, wherein said user visual acuity factor comprises at least one of a user demographic and a predefined user vision correction prescription.

In one embodiment, the device consists of a digital vehicle user interface, a digital watch, or a digital reader.

In one embodiment, the device further comprises an onboard or remotely interfaceable digital camera operable to display an image captured by said camera on said digital display such that said captured image is automatically corrected in accordance with said vision correction function for consumption by the user via said digital display.

In one embodiment, said computer-readable medium has further statements and instructions stored thereon for execution by said hardware processor to implement and render an interactive graphical user interface (GUI) on said digital display, wherein said interactive GUI incorporates a vision toggle function that dynamically toggles responsive to user action between distinct predefined vision correction modes. In one such embodiment, said distinct predefined vision correction modes include a non-corrected mode.

In accordance with another aspect, there is provided a computer-readable medium having statements and instructions stored thereon for execution by a hardware processor to implement a vision correction application on an electronic device having a digital display to at least partially compensate for a user's reduced visual acuity, said statements and instructions executable by said hardware processor to: access at least one designated user vision correction parameter selected from a plurality of available correction parameters to correspond with the reduced visual acuity of the user; correct an output image of the electronic device in accordance with a designated image correction function to output a correspondingly corrected output image, wherein said image correction function receives as input said at least one designated user vision correction parameter; and output said correspondingly corrected output image via said digital display so to at least partially compensate for the user's reduced visual acuity.

In accordance with one embodiment, said computer-readable medium has further statements and instructions stored thereon for execution by said hardware processor to implement and render an interactive graphical user interface (GUI) on said digital display, wherein said interactive GUI incorporates a dynamic vision correction scaling function that dynamically adjusts said at least one vision correction parameter in real-time in response to a designated user interaction therewith via said GUI. In one such embodiment, said dynamic vision correction scaling function comprises a graphically rendered scaling function and wherein said designated user interaction comprises a continuous slide motion operation, and wherein said GUI is configured to capture and translate a user's given continuous slide motion operation to a corresponding adjustment to said vision correction parameter scalable with a degree of said user's given slide motion operation. In one such embodiment, said graphically rendered scaling function comprises a substantially circular graphical scale and wherein said continuous slide motion operation consists of a substantially circular motion on said substantially circular graphical scale.

In one embodiment, the computer-readable medium further comprises statements and instructions to implement and render an interactive graphical user interface (GUI) on said digital display, wherein said interactive GUI incorporates a vision toggle function that dynamically toggles responsive to user action between distinct predefined vision correction modes corresponding to distinct vision correction parameters. In one such embodiment, said distinct predefined vision correction modes include a non-corrected mode.

In one embodiment, said computer-readable medium further comprises statements and instructions to process an image captured by an onboard or remotely interfaceable camera such that said captured image is automatically corrected in accordance with said vision correction function for consumption by the user via said digital display.

In one embodiment, the computer-readable medium is operable to access a display distance parameter representative of a distance between the user and the digital display and execute said vision correction function as a function of said distance. In one such embodiment, said display distance parameter is predefined as an average distance of the display screen in operation. In another such embodiment, the computer-readable medium is executable on distinct device types, and wherein said display distance parameter is predefined for each of said distinct device types. In another such embodiment, said average distance is at least partially defined for each given user as a function of a demographic of said given user.

In accordance with another aspect, there is provided a network-enabled vision correction system to implement vision correction on a plurality of electronic devices, each having a digital output display screen, a hardware processor, a computer-readable medium, and a communication interface, the system comprising: a network-accessible vision correction server having stored in association therewith a user profile for each system user, wherein each said user profile has stored in association therewith a respective system user identifier and at least one respective vision correction parameter selected from a plurality of vision correction parameters to at least partially correspond with a reduced visual acuity of said respective system user; a software application executable on each of the devices and comprising statements and instructions executable by the hardware processor thereof in correcting an output image to be rendered by the digital display thereof in accordance with a designated image correction function, wherein said image correction function receives as input said at least one vision correction parameter accessed from a given user profile as selected for a given system user, and thereby outputs a correspondingly corrected output image via said digital display to at least partially compensate for a reduced visual acuity of said given system user.

In one embodiment, the system further comprises a light-field optics to be layered on the digital output display screen of each of the devices, wherein said light-field optics is defined by at least one light-field optics parameter, and wherein said image correction function is configured to account for said light-field optics parameter in correcting said output image.

In one embodiment, said software application further comprises statements and instructions that, when executed by the hardware processor, render a user login, authentication or identification interface that receives as input user profile credentials, authentication or identification metrics, and relays said user credentials or metrics to said server in accessing said at least one vision correction parameter therefrom.

In one embodiment, said at least one vision correction parameter is automatically calculated by a server-accessible hardware processor as a function of at least one user visual acuity factor input by the user via the electronic device and communicated to said server via the communication interface for storage against said user profile, wherein said user visual acuity factor comprises at least one of a user demographic and a predefined user vision correction prescription.

In one embodiment, the system further comprises the plurality of electronic devices.

In one embodiment, said user login interface enables any given user to access its at least one vision correction parameter via respective electronic devices and have any said respective electronic device output said correspondingly corrected output image via said digital display upon successful login therewith.

In one embodiment, said user profile is remotely accessible upon user identification from any of said electronic devices so to execute said correspondingly corrected output image via any of said electronic devices in response to said user identification.

In one embodiment, said electronic devices comprises any one or more of cellular telephones, smartphones, smart watches or other smart devices, an onboard vehicle navigation or entertainment system, a network interfaceable vehicle dashboard and/or controls, and the like.

In accordance with another aspect, there is provided a network-enabled vision correction method to implement vision correction on a plurality of electronic devices, each having a digital output display screen, a hardware processor, a computer-readable medium, and a communication interface, the method comprising: providing access to a vision correction application executable on each of the remote electronic devices to correct an output image to be rendered by the digital display in accordance with a designated image correction function; storing on a remote server a respective user profile for each of a plurality of registered users, and storing in association therewith at least one designated vision correction parameter corresponding with a respective reduced visual acuity for each of said registered user and a respective digital user identifier usable in remotely identifying each of said registered users; receiving at an application server over the network a given digital user identifier from a given registered user operating any given one of the remote electronic devices; the application server: identifying said given registered user against a corresponding stored user profile as a function of said given digital user identifier; retrieving said at least one designated vision correction parameter stored in association therewith; and transmitting said at least one designated vision correction parameter over the network to said given one of the remote electronic devices so to invoke execution of said designated image correction function thereon based at least in part on said at least one designated vision correction parameter and thereby output a correspondingly corrected output image via the digital display to at least partially compensate for a reduced visual acuity of said given registered user.

In one embodiment, the vision correction application is further executable to graphically render a real-time vision correction adjustment interface that dynamically adjusts said at least one designated vision correction parameter in real-time responsive to user interaction with said interface in dynamically adjusting said corrected output image accordingly, and digitally record an adjusted vision correction parameter corresponding to a preferred corrected output image setting selected by said given registered user user via said interface, wherein the method further comprises: receiving over the network a vision correction parameter adjustment command at said application server from said given one of the remote electronic devices indicative of said adjusted vision correction parameter; and storing said adjusted vision correction parameter against said given user profile.

As introduced above, and in accordance with some aspects, a method and system are provided for the correction of vision on an electronic device, for instance where a combination of resident software and hardware on a user's electronic device can be dynamically controlled to manipulate the image displayed thereby in order to make the image clearer, at least to some significant level, to users with reduced visual acuity and/or visual impairments, commonly referred to herein as reduced visual acuity. For example, the software and hardware combination may allow for vision corrections similar to that achievable using conventional prescription lens, adjusting any one of more of a rendered image's hue, contrast, and brightness, for example.

In some embodiments, the system may be configured to invoke a server-based calibration process that not only allows for the centralized management of a user's calibration parameters, which may facilitate, enhance or enable various user-centric account or profile features such as calibration portability between user, public or shared devices, but also allow for the accumulation, tracking and analysis of calibration parameters from multiple users or subscribers. The latter may be used to better predict and deliver more accurate display correction settings to each user based on similarities observed between reported user conditions and selected settings, thus further enabling the provision of visual settings that allow a greater cross section of the population to use their device without the need for corrective lenses.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

DETAILED DESCRIPTION

The systems and methods described herein provide, in accordance with different embodiments, different examples of an electronic device having an adjustable graphical display, and a vision correction system, method and graphical user interface therefor.

Figure 1:
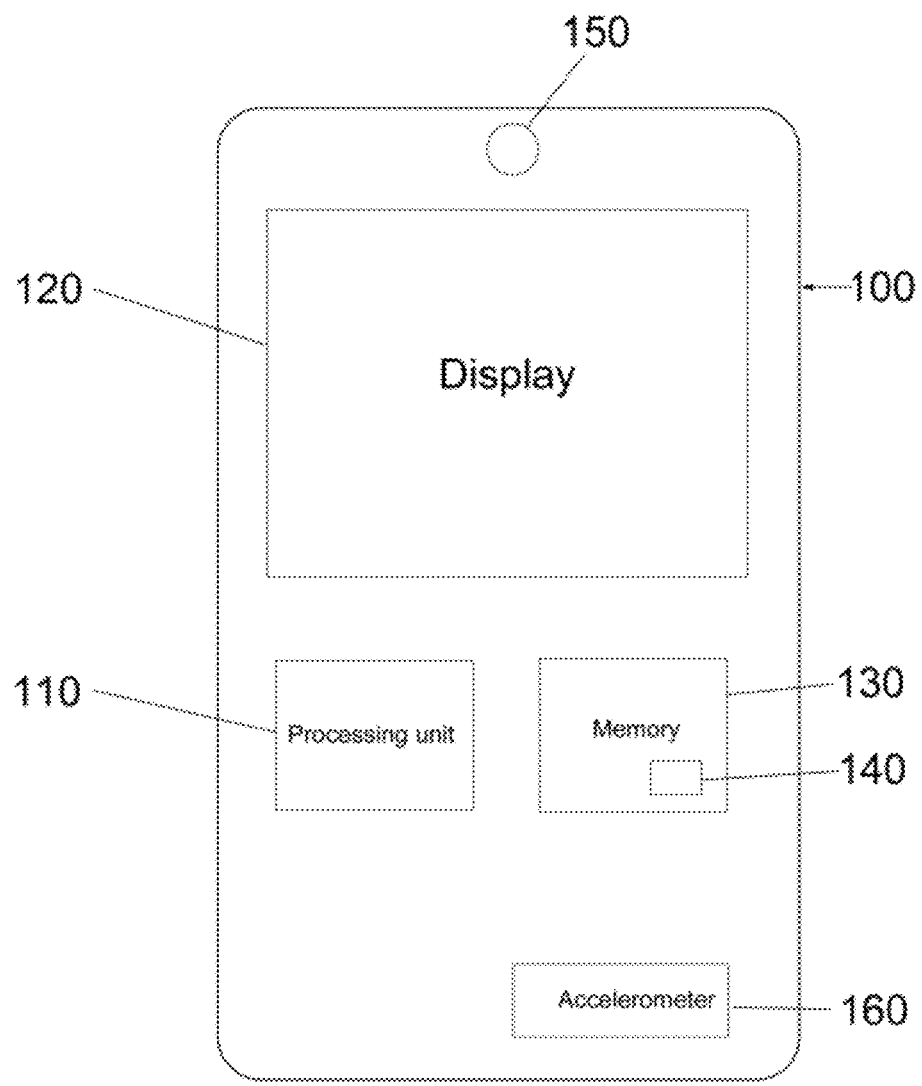
FIG. 1 is a diagrammatical view of an electronic device having an adjustable graphical display, in accordance with one embodiment.

FIG. 1 illustrates an electronic device 100 according to an embodiment. Electronic device 100, while depicted as a cellular telephone, is not limited to a cellular telephone. Other devices capable of implementing the disclosed embodiments include, for example, smartphones, tablets, e-readers, watches, televisions, GPS devices, laptops, and desktop computers. Likewise, an onboard vehicle entertainment or control module having a digital screen output or the like may also be considered, as can a digital watch, such as smart watch or the like. Any electronic device capable of performing the present embodiments is considered to be within the scope of electronic device 100.

Electronic device 100 includes a processing unit 110, a display 120, and internal memory 130. Display 120 can be an LCD screen, a monitor, a plasma display panel, an e-mounted display, or any other type of electronic display. Internal memory 130 can be any form of electronic storage, including a disk drive, optical drive, read-only memory, random-access memory, or flash memory. Memory 130 has stored in it vision correction application 140. Electronic device 100 may optionally include a front-facing camera 150, and an accelerometer 160. Accelerometer 160 is capable of determining the tilt and/or orientation of electronic device 100.

Figure 2:
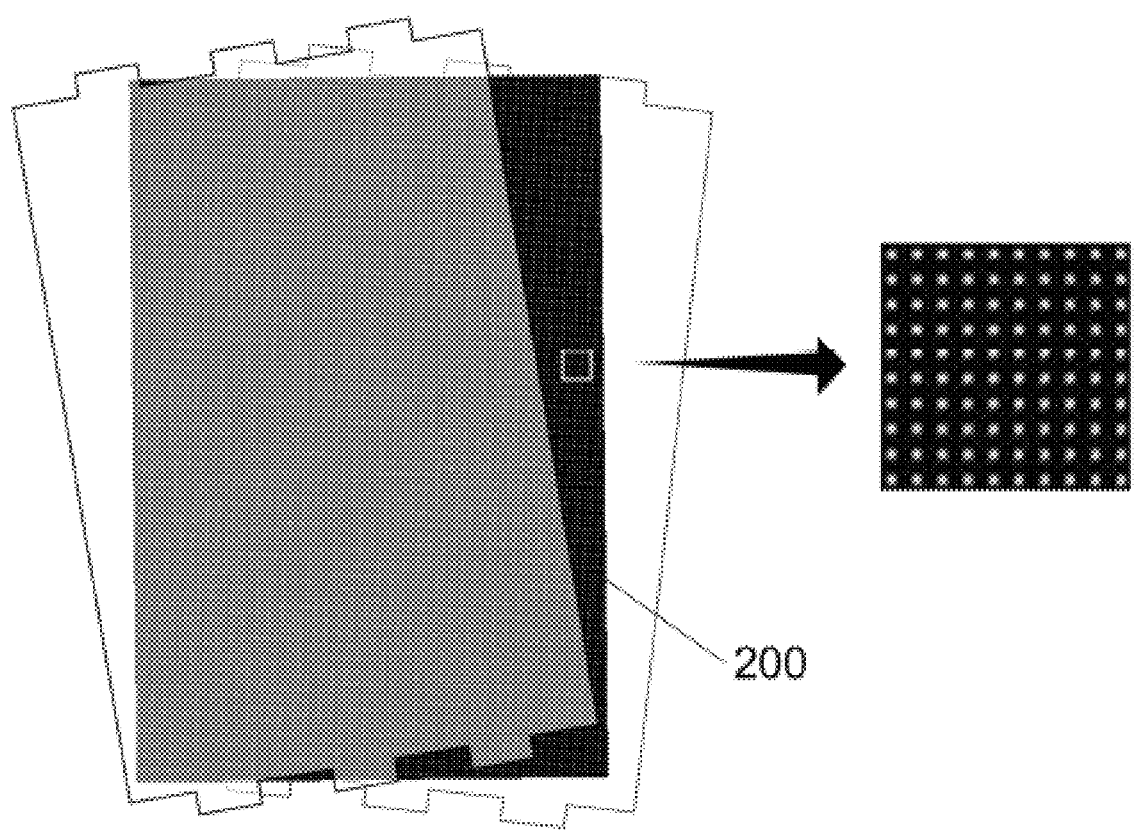
FIG. 2 is an exploded view of a graphical display mask for use in cooperation with an adjustable graphical display of an electronic device and showing an enlarged portion of a pinhole layer thereof, in accordance with one embodiment.

FIG. 2 illustrates a pinhole mask 200 according to one embodiment. Pinhole mask 200 comprises a piece of transparent material, such as transparency plastic. Other transparent materials may be used instead of transparency plastic. Printed on pinhole mask 200 is a pattern of pinholes. The enlargement in FIG. 2 shows this pattern more clearly. In one embodiment, the size of the pinholes is dependent upon, and slightly less than, the size of the individual pixels of display 120. For example, in one embodiment, the pixels of display 120 are each 78 microns wide, and the pinholes are each 75 microns in diameter. The size of the pinhole also represents a tradeoff between brightness and diffraction, with the former preferably to be maximized and the latter preferably to be minimized. In one embodiment, the pinholes are spaced 390 microns apart.

Figure 3:
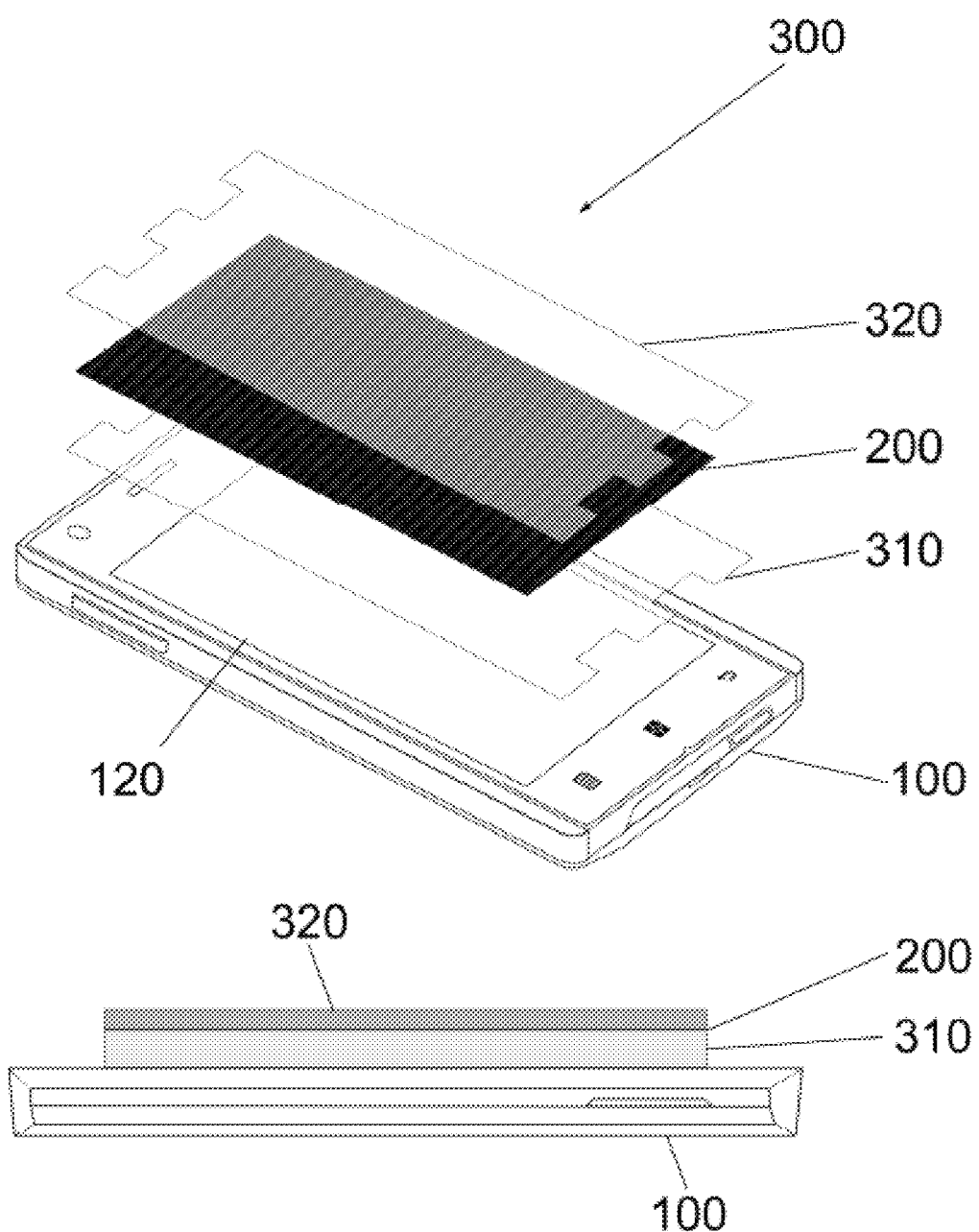
FIG. 3 is exploded and side views of an assembly of the graphical display mask of FIG. 2 overlaying an adjustable graphical display of an electronic device to produce a parallax barrier light field display, in accordance with one embodiment.

FIG. 3 illustrates a vision correcting device 300 according to one embodiment. Vision correcting device 300 comprises electronic device 100, with transparent spacer 310 on top of display 120. On top of transparent spacer 310 is pinhole mask 200. On top of pinhole mask 200 is optional screen protector 320. In FIG. 3, the width of transparent spacer 310, pinhole mask 200, and screen protector 310 are not drawn to scale. In one embodiment, the thickness of spacer 310 is 4 millimetres.

Figure 4:
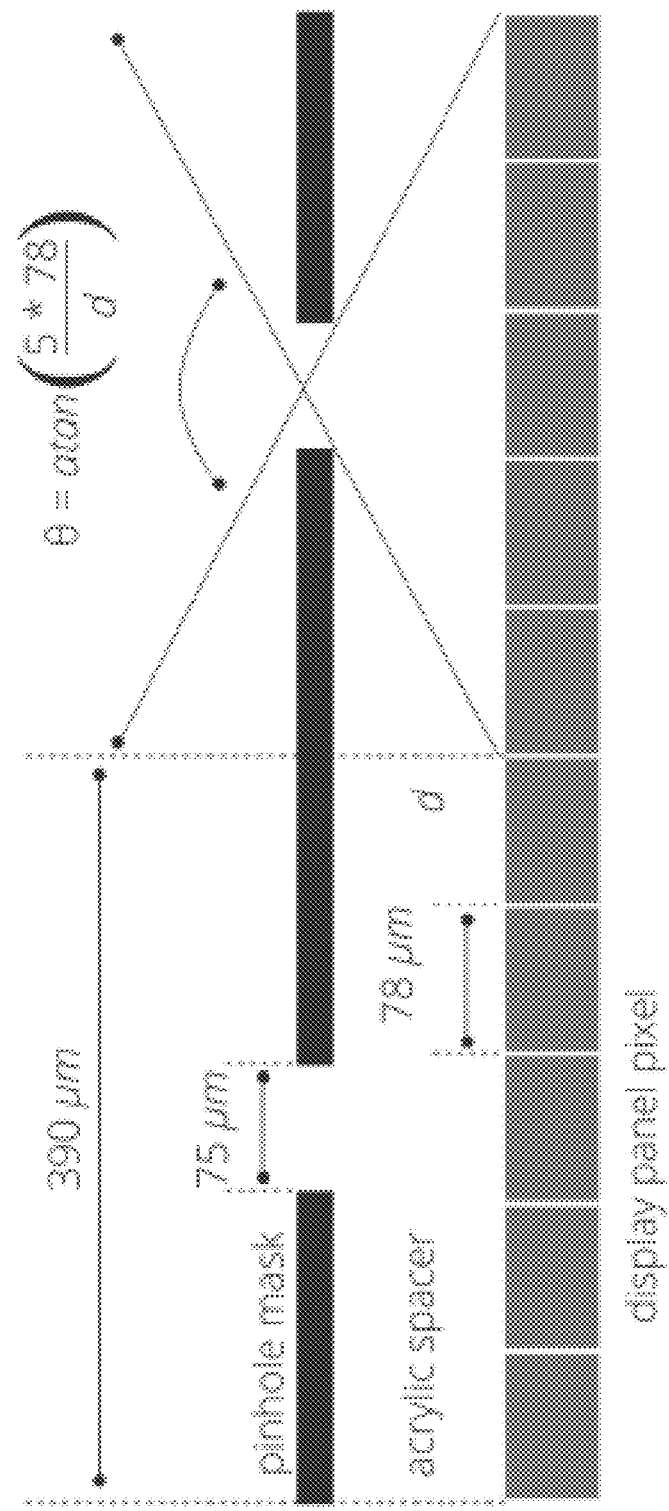
FIG. 4 is a partial diagrammatic representation of an effect of the parallax barrier light field display of FIG. 3.

The device of FIG. 3 creates a parallax barrier light field display. FIG. 4 shows, in part, the effect of the parallax barrier light field display of FIG. 3. This display has a number of views that is calculated by dividing the separation of the pinholes by the width of the pixels of the display.

In the embodiment shown in FIG. 4, the display would have 5 (390÷78) views. In addition, the field of view (θ) can be calculated via the following formula:

$$\theta = \tan^{-1} \frac{\Delta x}{d}$$

where Δx is the pinhole separation and d is the width of spacer 310.

While FIGS. 2 and 3 describe an embodiment that uses a pinhole mask to create a parallax barrier light field display, other light field display technologies, such as lenslet arrays and multilayer designs, are within the scope of the present disclosure.

In one embodiment, vision correction application 140 runs as a process on processing unit 110 of electronic device 100. As it runs, it pre-filters the output of display 120.

Figure 5:
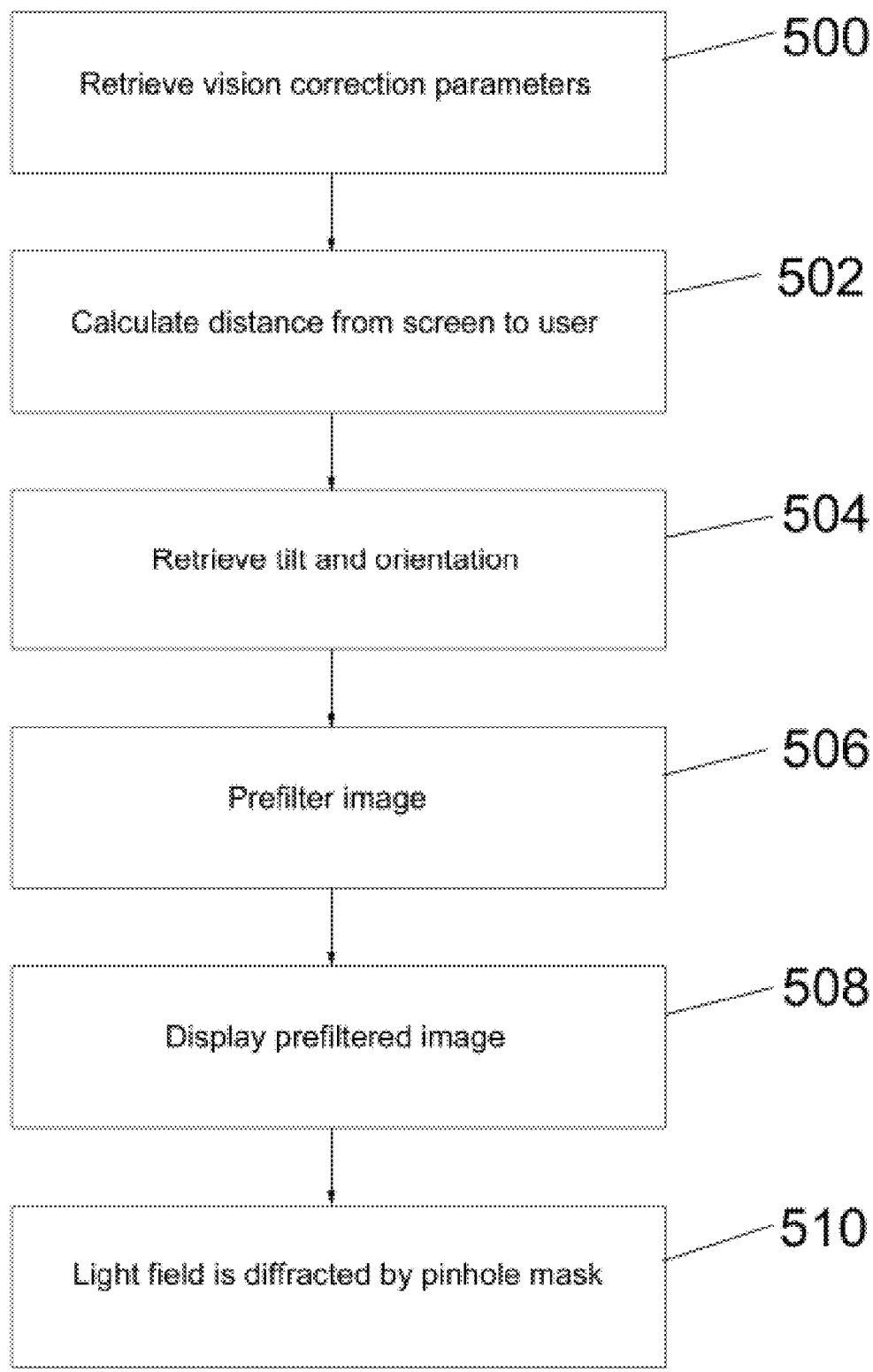
FIG. 5 is a flow chart of an image pre-filtering process to be applied in pre-filtering an image to be displayed by the display of the electronic device of FIG. 3 through the mask layered thereon, in accordance with one embodiment.

FIG. 5 illustrates a pre-filtering method according to one embodiment. This method describes the process by which the images displayed on screen 120 are pre-filtered according to stored vision correction parameters.

In step 500, a user's vision correction parameters are retrieved from internal memory 130, which may permanently store the user's vision correction parameter(s) or again retrieve them from an external database upon user login and/or client application launch. For instance, in the latter example, the user's current vision correction parameter(s) may be actively stored and accessed from an external database operated within the context of a server-based vision correction subscription system or the like, and/or unlocked for local access via the client application post user authentication with the server-based system.

In optional step 502, on electronic devices that include front-facing camera 150, the distance from the screen to the user is calculated using information retrieved from front-facing camera 150.

In optional step 504, on electronic devices that include accelerometer 160, the tilt and orientation of electronic device 100 are retrieved from accelerometer 160.

In step 506, the vision correction information and, if applicable, the distance from the screen to the user and/or the tilt and orientation of electronic device 100 are used as input to an image pre-filtering function to pre-filter the image.

Several different pre-filtering algorithms may be used for this stop, either alone or in combination, including deconvolution algorithms, an iterative Richardson-Lucy algorithm, an all-pass kernel pre-filtering algorithm, and a light field pre-filtering algorithm. Some examples of pre-filtering algorithms are described in Fu-Chung Huang, Gordon Wetzstein, Brian A. Barsky, and Ramesh Raskar. "Eyeglasses-free Display: Towards Correcting Visual Aberrations with Computational Light Field Displays". *ACM Transaction on Graphics*, xx:0, August 2014, the entire contents of which are hereby incorporated herein by reference.

In step 508, the pre-filtered image is displayed on screen 120 as a corrected output image.

In step 510, the light field emitted from the pre-filtered display passes through pinhole mask 200, and is diffracted by pinhole mask 200.

Through the method illustrated in FIG. 5, a user can view a corrected image without the need for glasses or other vision correction implements.

In yet another example, the user of a camera-enabled electronic device may use this function, along with the image correction capabilities described herein, to read or view printed or other materials via the electronic device rather than directly. For example, a user of a camera-enabled smartphone may use their smartphone as a visual aid to read a menu at a restaurant or a form at a medical appointment by activating the vision correction application along with a back-facing camera feature of the application (or again simply activating the camera function of the smartphone), and pointing the phone to the hardcopy materials to be viewed. By virtue of the image correction application, while the camera may automatically focus on the image, the rendered image on the screen will be displayed so to correct for the user's visual acuity and thus, may appear somewhat blurred or out of focus to an individual with perfect vision, but appear perfectly clearly to the user as if he were otherwise wearing their glasses.

Figure 6A:
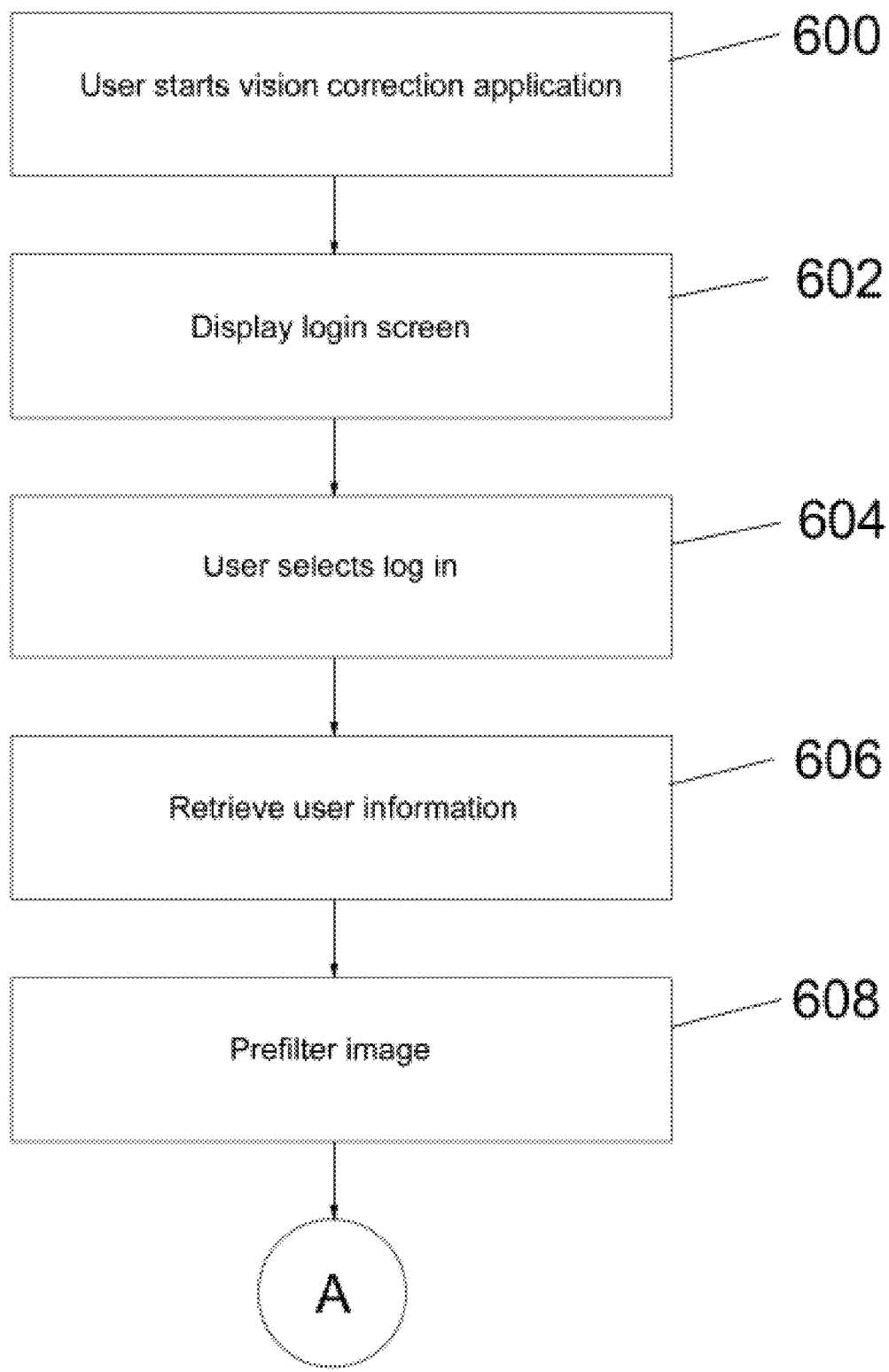
FIG. 6A is a flow chart of a user login process for a server-based vision correction system, in accordance with one embodiment.

With reference to FIG. 6A, and in accordance with one embodiment, a method will be described for launching and operating a vision correction application from a client device in communication with a remote server operated to provide client access to vision correction data, user services and subscriptions, and the like. The illustrated method starts in step 600, where a user of electronic device 100 starts vision correction application 140 in a way appropriate to the type of electronic device being used. For example, if the electronic device is a smartphone, the user touches the icon corresponding to vision correction application 140.

Figure 9:
FIG. 9 is an exemplary screenshot of a graphical user interface rendered on a user's electronic device and implemented in respect of a vision correction system to show a vision correction application launching screen thereof, in accordance with one embodiment.

In step 602, a screen, such as that shown for example at FIG. 9, is displayed to the user, giving the user the option of logging in (if the user is already registered) or registering as a new user.

Figure 10:
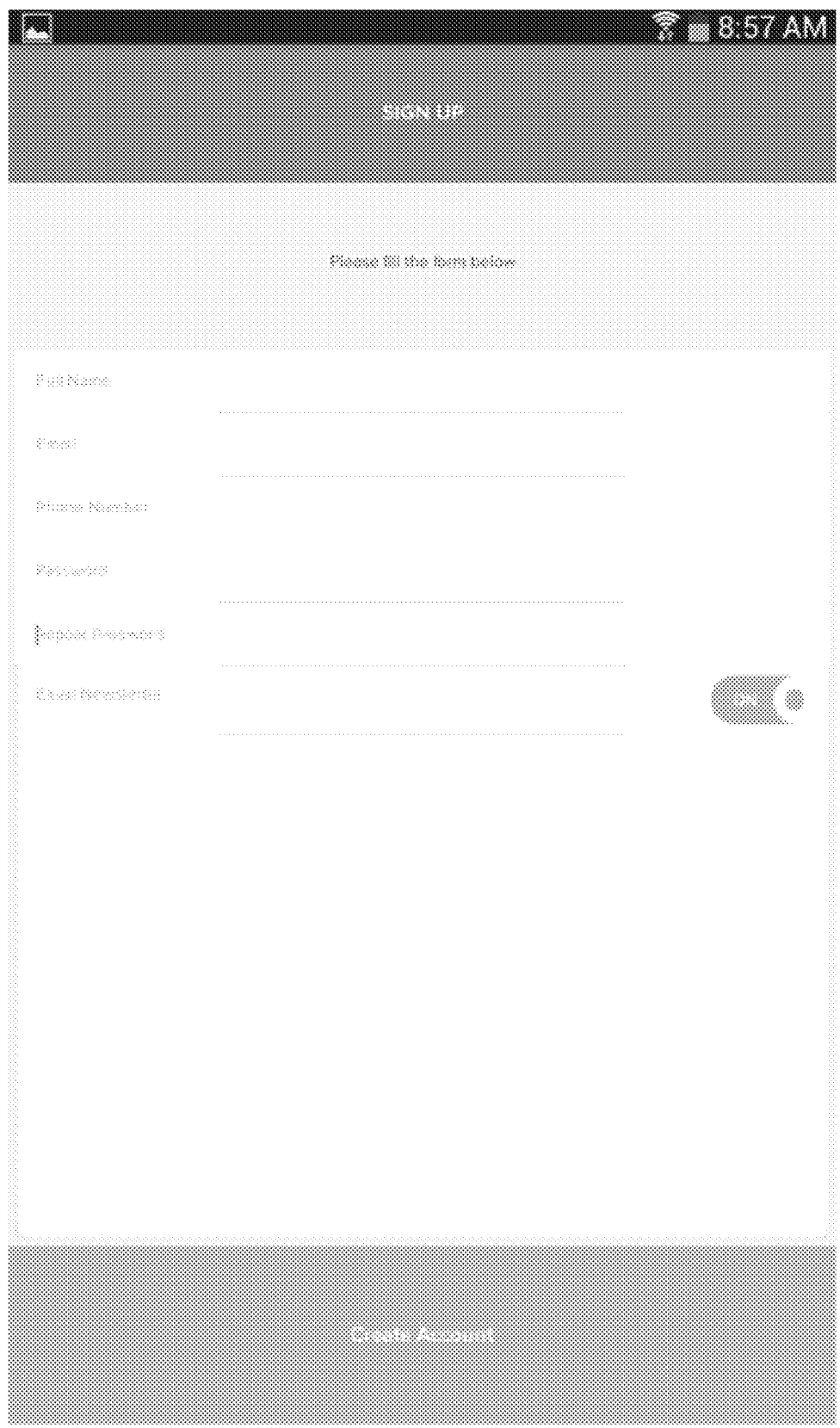
FIG. 10 is an exemplary screenshot of a graphical user interface rendered on a user's electronic device and implemented in respect of a vision correction system to show new account setup screen thereof, in accordance with one embodiment.

With reference to FIG. 10, and in accordance with one embodiment, an illustrative registration screen is provided in which a new user may be asked to provide their full name, email address, phone number, password (e.g. to secure use of their vision correction application, user profile and/or subscription information such as payment options and credentials), and the like, thereby setting up a new user profile for the user as basis for their use of the client application.

Figure 11:
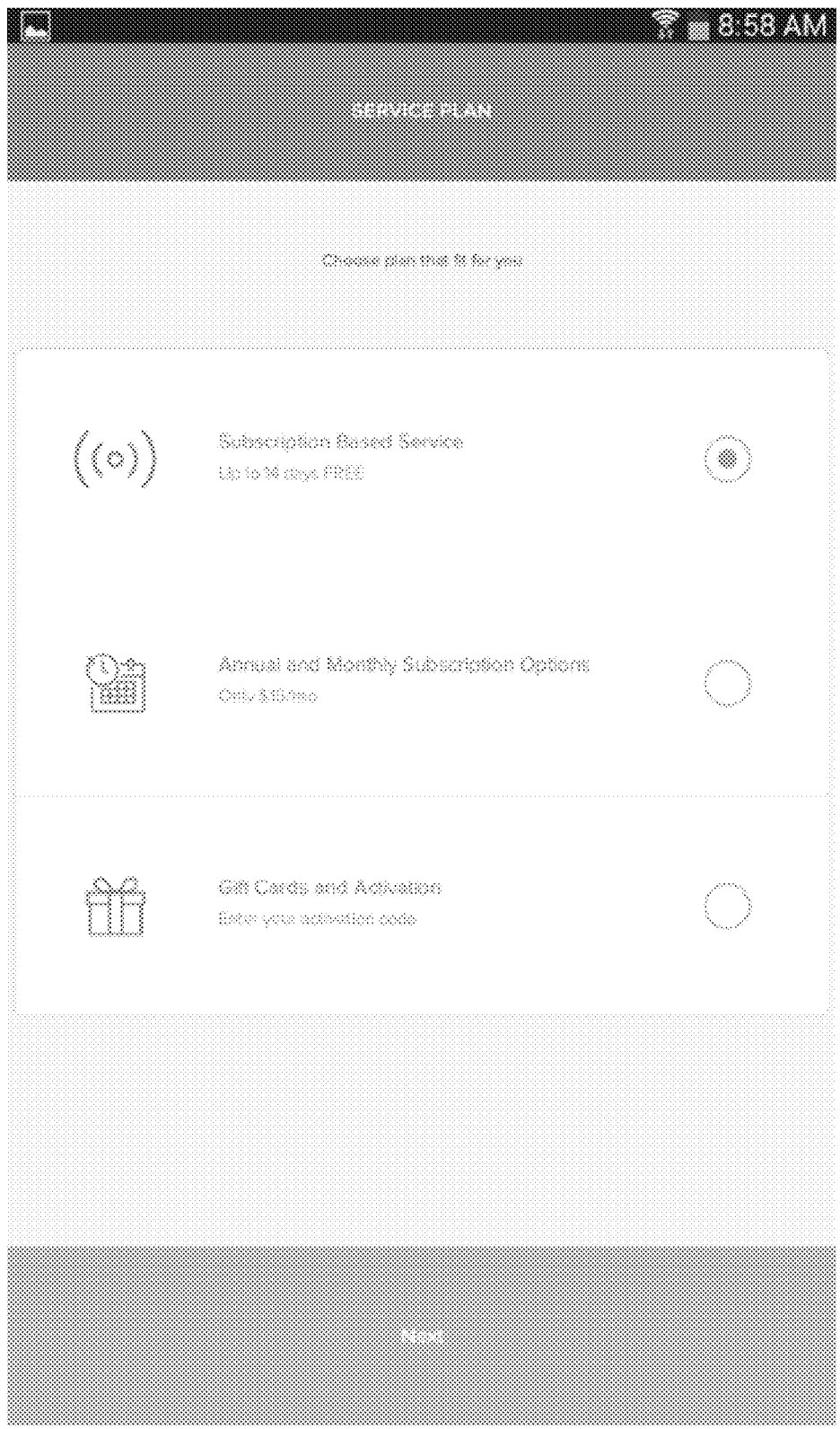
FIG. 11 is an exemplary screenshot of a graphical user interface rendered on a user's electronic device and implemented in respect of a vision correction system to show a service plan selection screen thereof, in accordance with one embodiment.

With reference to FIG. 11, and in accordance with one embodiment, the new user may then be asked to select a payment option, such as an annual or yearly subscription basis, or again offered the option of purchasing a gift card for the purpose of offering vision correction application services to a friend or family member as a gift. Other registration steps and features may also be performed without departing from the general scope and nature of the present disclosure, such as entering payment or prepayment information, user demographics usable in tailoring user services and/or compiling user data and/or statistics, and the like.

Figure 12:
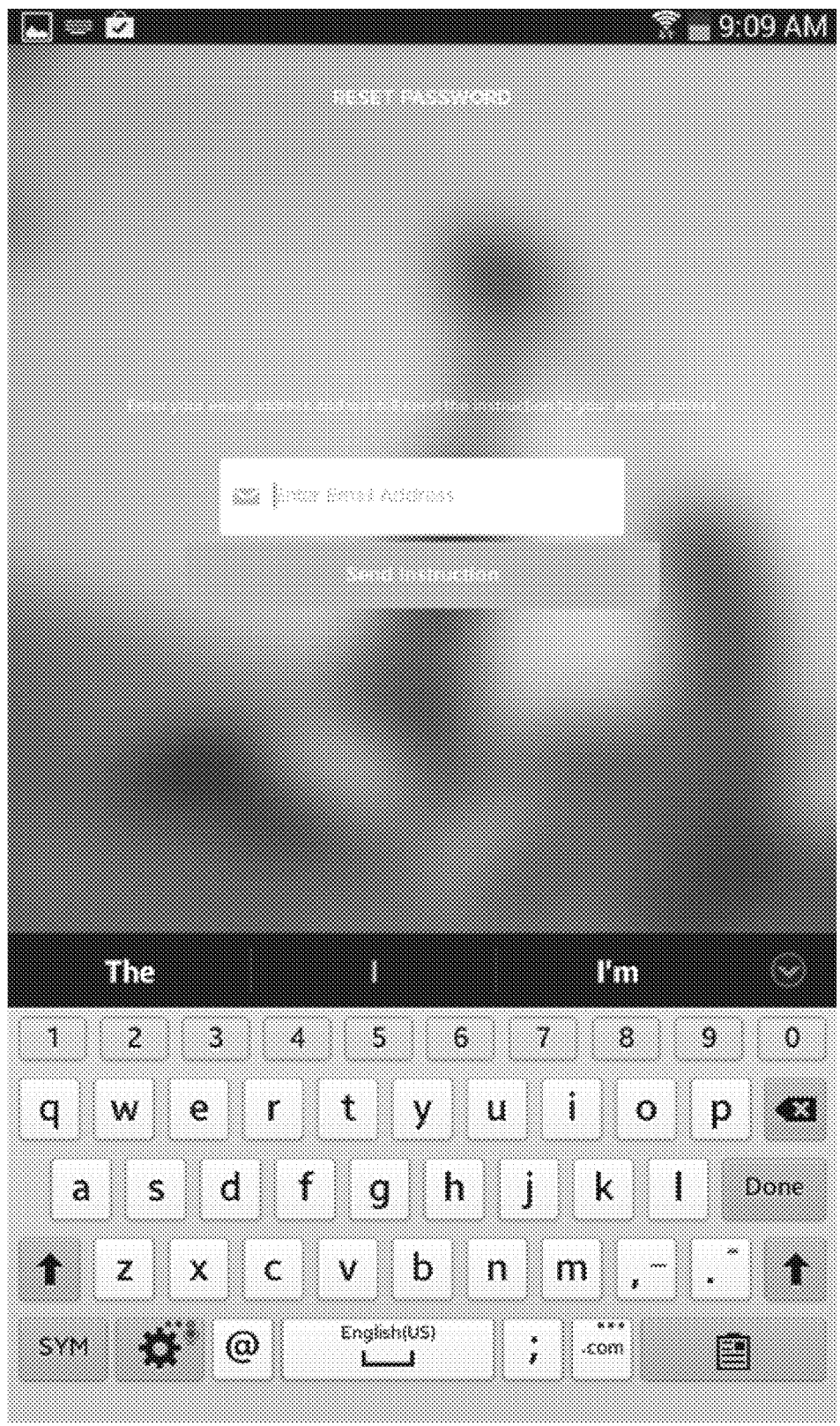
FIG. 12 is an exemplary screenshot of a graphical user interface rendered on a user's electronic device and implemented in respect of a vision correction system to show an access password reset screen thereof, in accordance with one embodiment.

With reference again to FIG. 6, in step 604, an otherwise registered user selects the option to log in, and enters his or her account information. The account information is verified according to standard methods known by those of ordinary skill in the art. The account information may include information about the user's Facebook, Twitter, Google+, or any other social media account. Where a user has forgotten their credentials, they may be directed to a reset password screen, such as that shown in FIG. 12, in which the registered user may enter the email address associated with their user profile and subsequently receive a reset password via that email address. Other approaches can also be considered, as will be appreciated by the skilled artisan.

In step 606, in response to a successful login, the user's information is retrieved from an external database. This information includes preset or current vision correction parameters. This information may also include eye prescription information. The eye prescription information may include the following data: left eye near spherical, right eye near spherical, left eye distant spherical, right eye distant spherical, left eye near cylindrical, right eye near cylindrical, left eye distant cylindrical, right eye distant cylindrical, left eye near axis, right eye near axis, left eye distant axis, right eye distant axis, left eye near prism, right eye near prism, left eye distant prism, right eye distant prism, left eye near base, right eye near base, left eye distant base, and right eye distant base. The eye prescription information may also include the date of the eye exam and the name of the eye doctor that performed the eye exam.

In step 608, the retrieved information is used to pre-filter the display as described above with respect to the method in FIG. 500.

Figure 13:
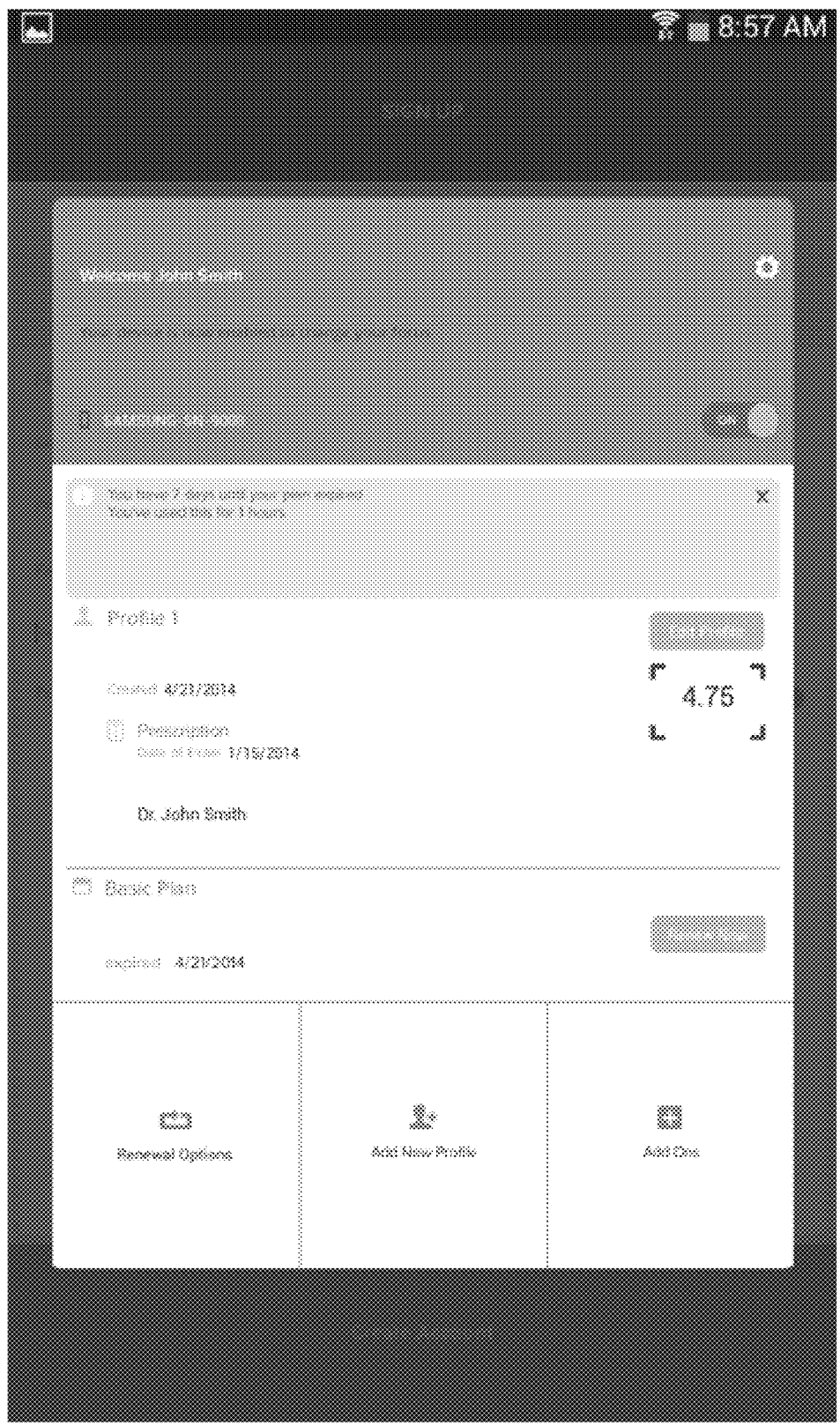
FIG. 13 is an exemplary screenshot of a graphical user interface rendered on a user's electronic device and implemented in respect of a vision correction system to show a user profile screen thereof, in accordance with one embodiment.
Figure 14A:
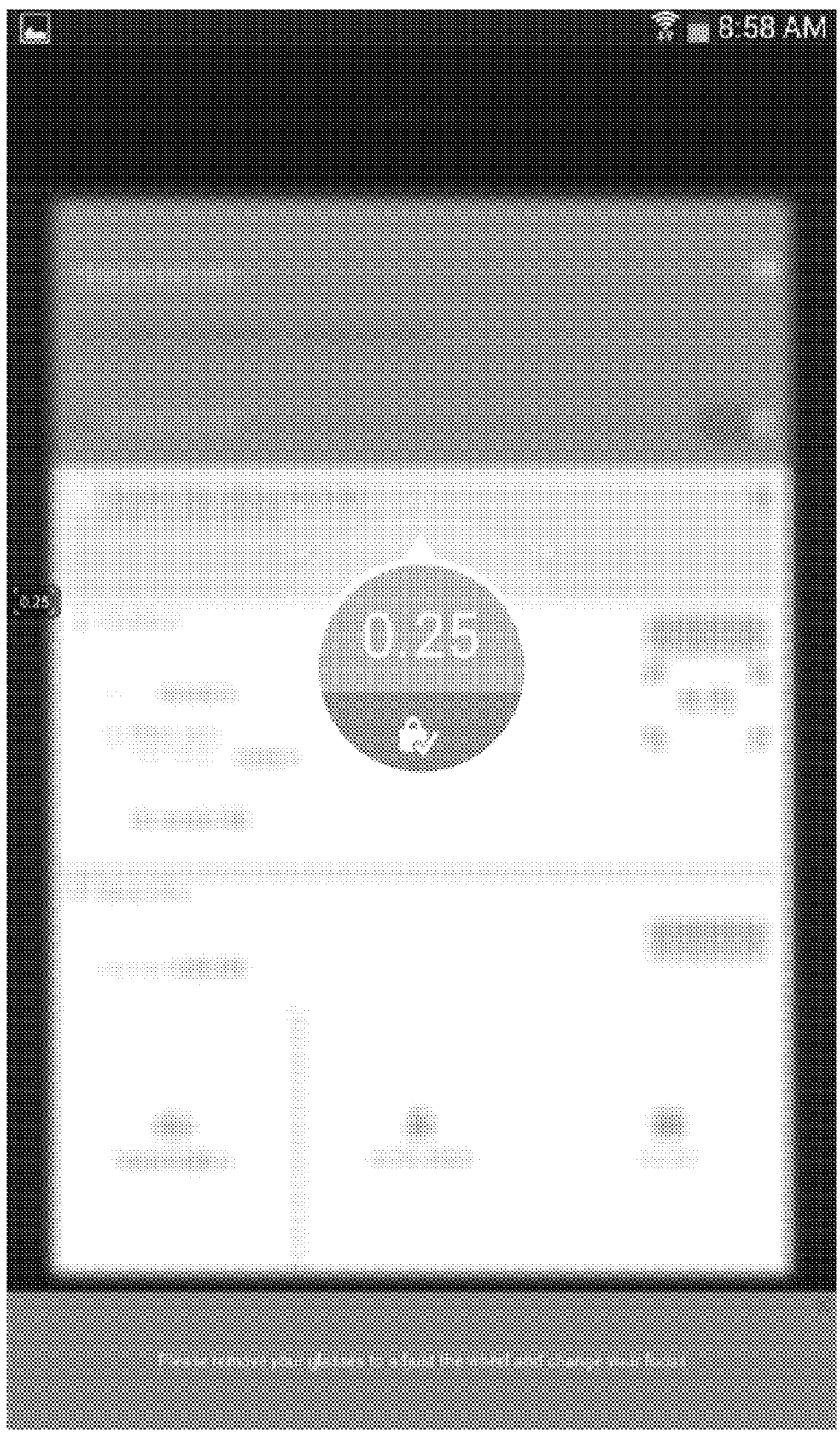
FIGS. 14A to D are exemplary screenshots of a graphical user interface rendered on a user's electronic device and implemented in respect of a vision correction system to show a sequence of dynamically updated vision correction calibration screens thereof in which an applied vision correction is updated in real-time in response to an incremental user input applied thereto, in accordance with one embodiment.
Figure 14B:
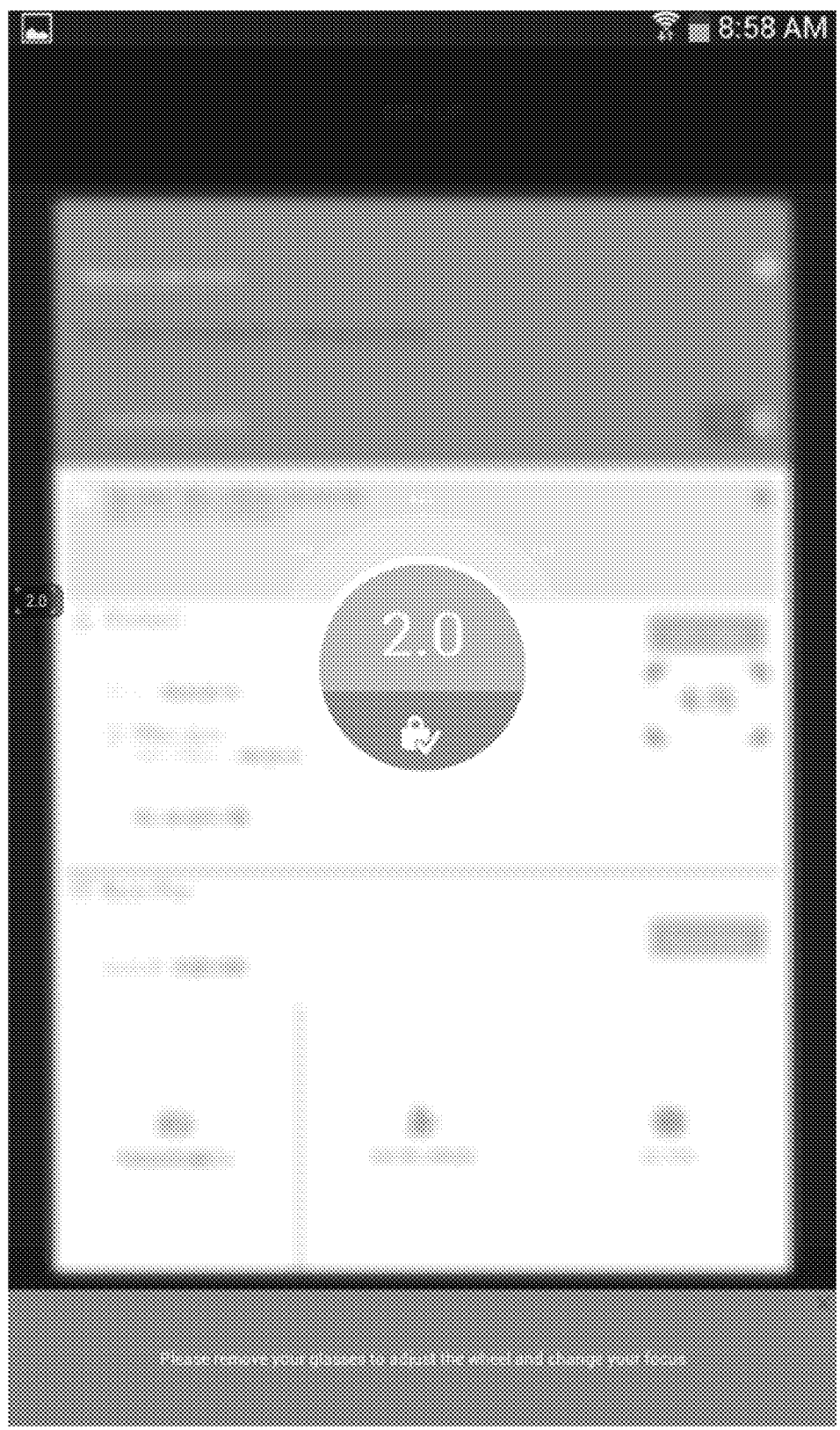
Figure 14C:
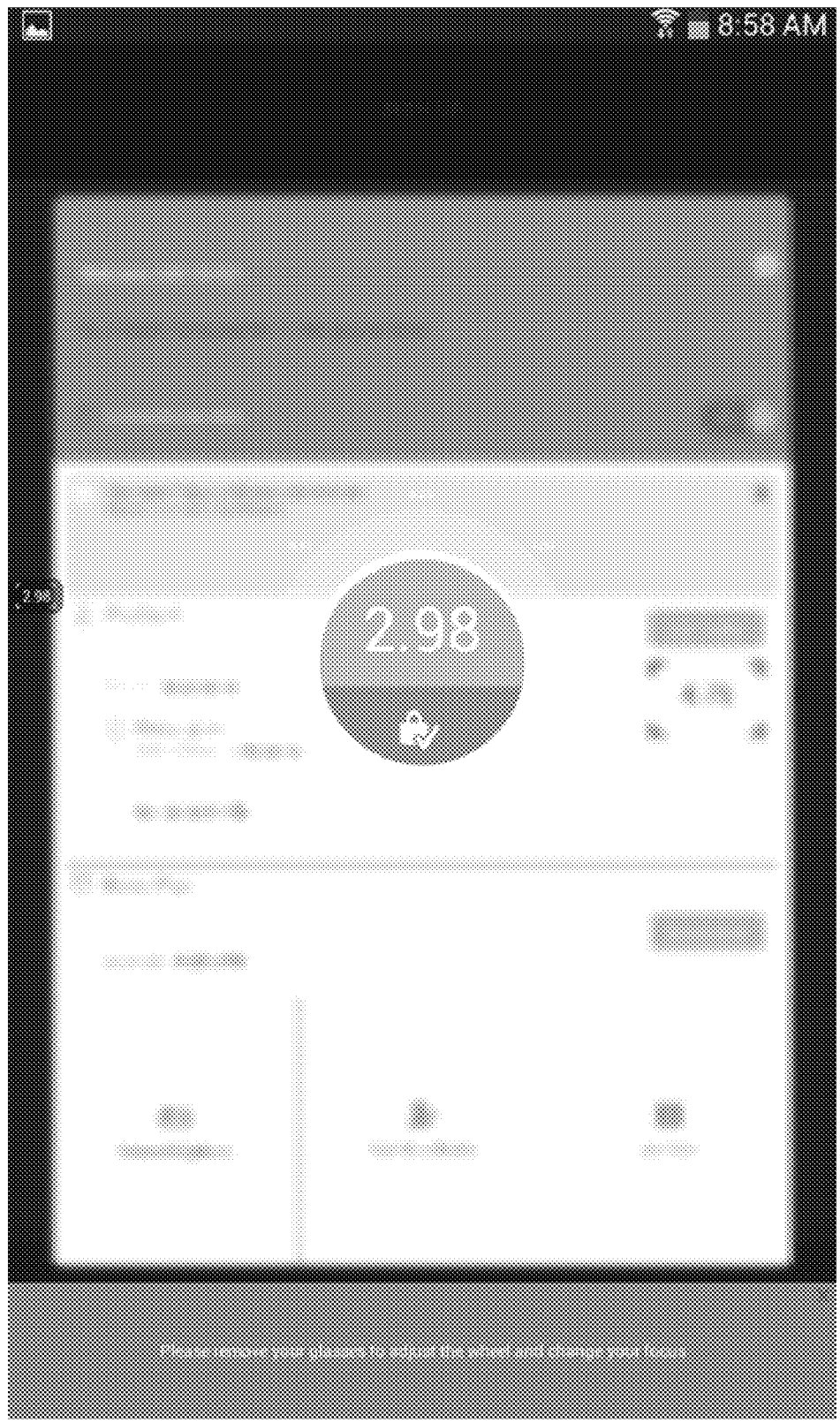
Figure 14D:
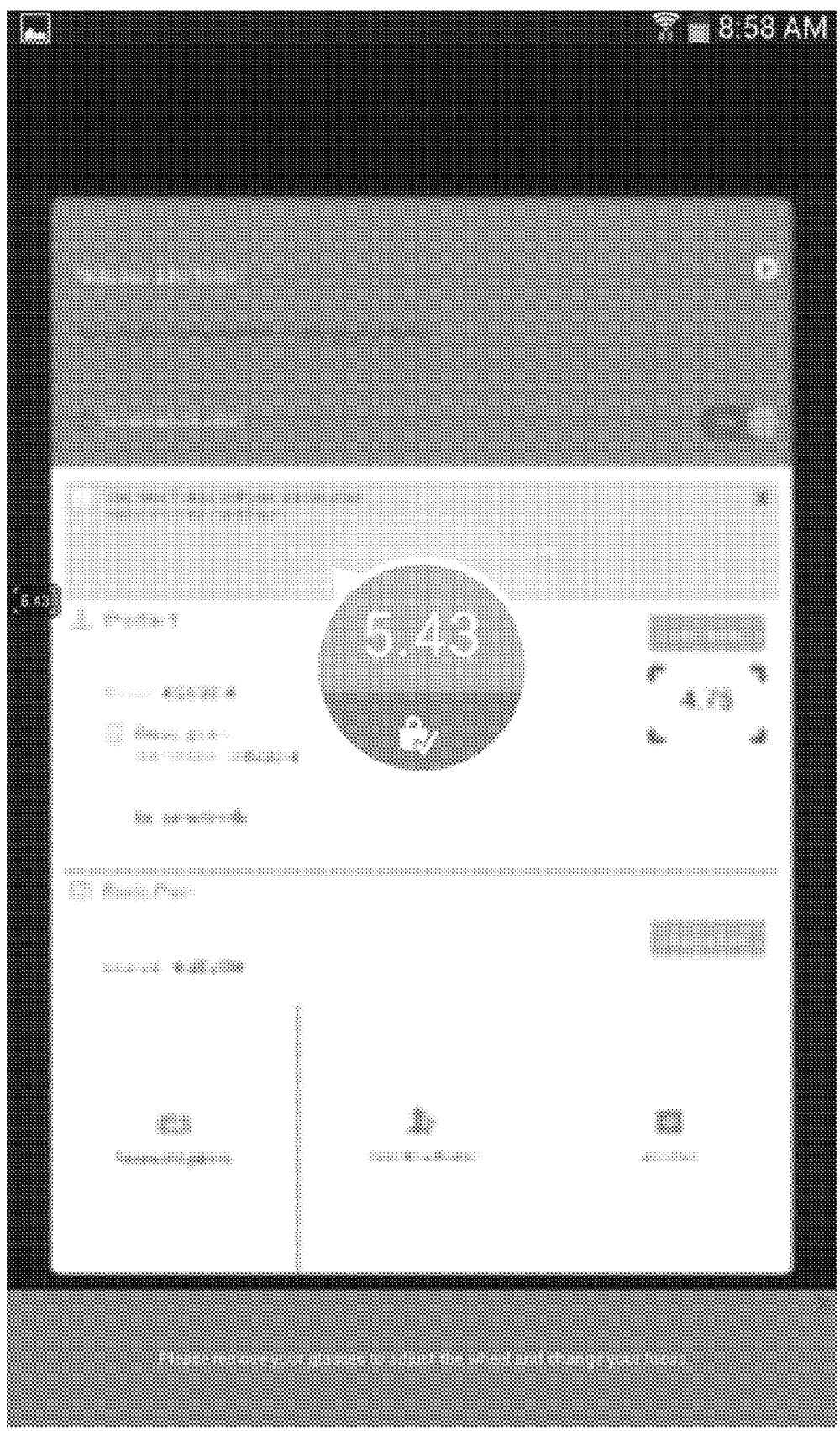

FIG. 13 provides an illustrative example of a user profile screen, for example shown upon successful launch of the client application, and in which various user and/or device profile information may be included. For example, the profile screen may include the name of the user's device(s) enabled to operate the vision correction application, a subscription status message (e.g. noting time left before a next payment is due) and details, the profile's creation date, the date of the user's last eye exam and the name of the physician who performed the exam, the current prescription value (e.g. 4.75), as well as various optional function buttons providing access to, for example, different subscription renewal options and/or payment screens, the option to add a new user profile under a same subscription package (e.g. a family package or package for shared users of a same device), and various other add-ons, for example.

In step 610, the user selects an option to refocus the display, for example via an "edit profile" button rendered on the profile screen.

Figure 7:
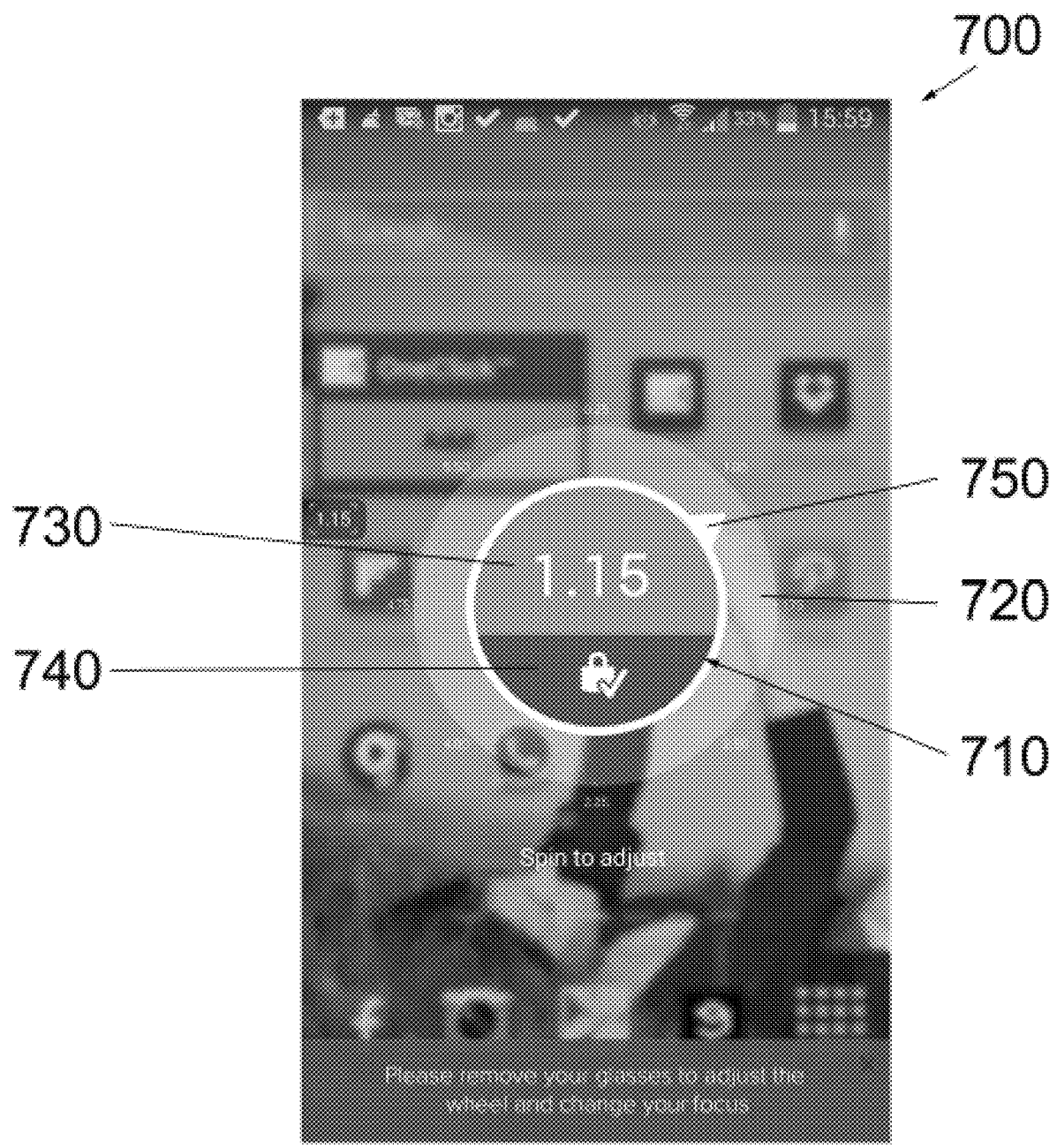
FIG. 7 is an exemplary screenshot of a graphical user interface rendered on a user's electronic device and implemented in respect of a vision correction system to show a calibration screen thereof, in accordance with one embodiment.

In step 612, a calibration screen is presented to the user. FIG. 7 shows calibration screen 700 in one embodiment. In this embodiment, the calibration screen comprises a circular area 710 in the center of the screen, surrounded by a circular track 720. Circular area 710 comprises a parameter display area 730 and a button 740. Input pointer 750 can move around circular track 720 responsive to input from the user.

In step 614, the user moves input pointer 750 around circular track 720. As input pointer 750 is moved, the vision correction information is updated based on the position of input pointer 750. In addition, the image on display 120 is adjusted based on the updated vision correction information.

With reference to FIGS. 14A to D, operation of the calibration screen 700 of FIG. 7 is shown in sequence while illustrating a dynamic effect such operation has on a visibility to the user of the calibration screen's background image as the vision correction parameter(s) is/are dynamically adjusted in real-time. For example, the image is shown to sharpen progressively as the effective prescription rating progresses continuously from 0.25 in FIG. 14A, to 2.0 in FIG. 14B, to 2.98 in FIG. 14C, but is then overshot as the effective prescription rating jumps to 5.43 at FIG. 14D. Accordingly, the user may fine tune their effective prescription rating, either as their visual acuity changes over time or perhaps for different times of the day or under different ambient lighting conditions, or generally as a preference using different devices and/or setting.

The method of inputting and/or calibrating the vision correction information is not limited to the calibration screen shown in FIG. 7 and FIGS. 14A to D. Other methods for inputting the vision correction information will be readily apparent to one of ordinary skill in the art, and may include manually inputting the parameter, moving a linear slider control, selecting a point on a grid, or any other method for inputting a parameter.

In step 616, the user presses button 740 and the vision correction information is saved in the external database for later retrieval.

In step 618, the user selects an option to input prescription and demographic information.

In step 620, a prescription input screen is presented to the user. This screen includes data entry fields for each of the prescription information settings. The user then inputs the prescription information and the prescription information is saved in internal memory 130.

Alternatively, a left eye prescription input screen may be presented to the user first, followed by a right eye prescription input screen. In this embodiment, the user inputs the corresponding prescription information in each screen and the prescription information is saved in the external database.

In step 622, a demographic information input screen is presented to the user. The screen includes data entry fields for demographic information, e.g. race, sex and age. The user then inputs the demographic information and the demographic information is stored in the external database.

In step 624, the prescription and demographic information is associated with the user's vision correction information in the external database.

In step 626, the user selects an option to enable/disable the vision correcting function of vision correction application 140.

In step 628, if the vision correcting function was enabled, it is disabled. If it was disabled, it is enabled. The state of the vision correcting function, whether enabled or disabled, is stored in internal memory 130 of electronic device 100.

Figure 8:
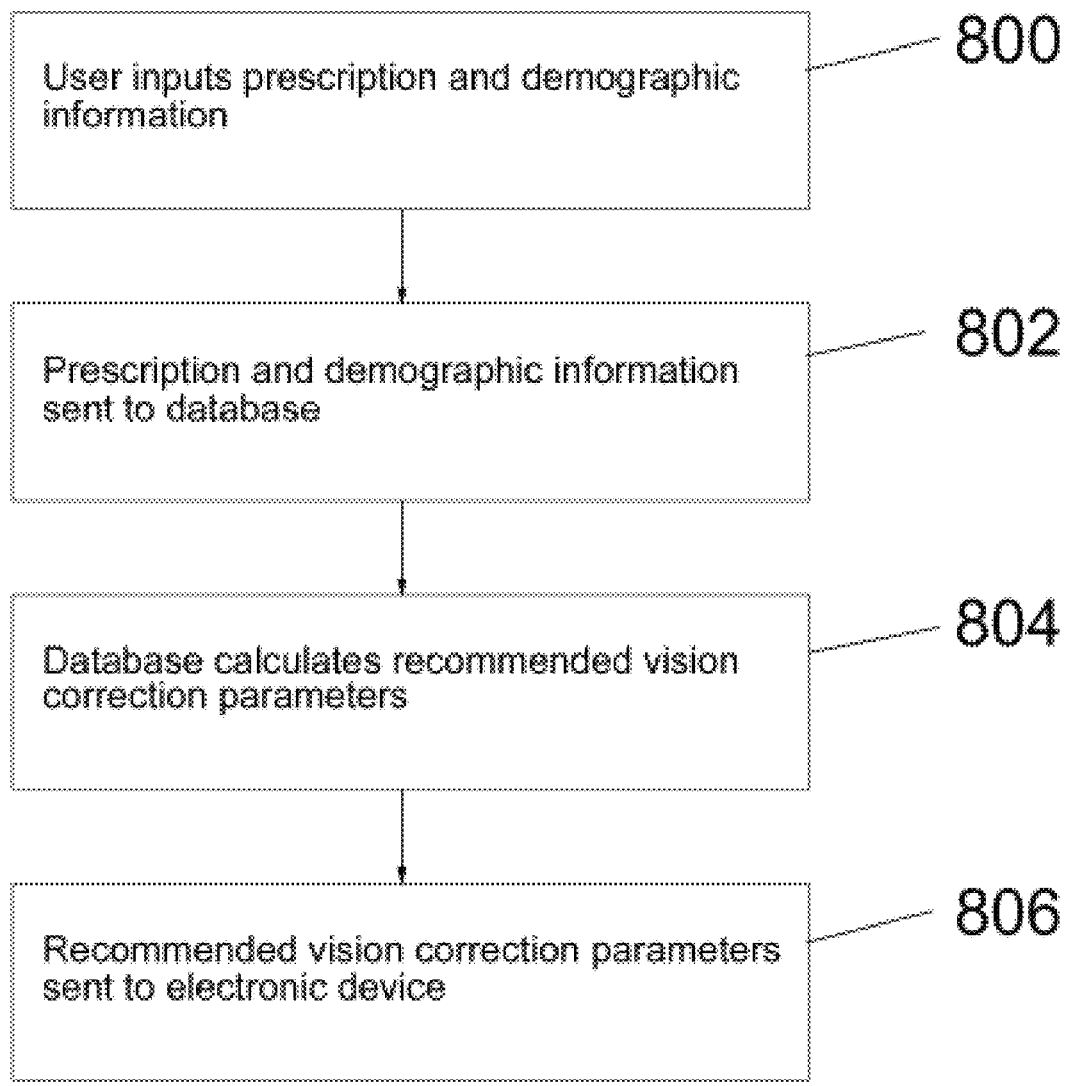
FIG. 8 is a flow chart of server-based process for retrieving and delivering recommended vision correction parameters to a user's device in response to input user prescription and/or demographic information, in accordance with one embodiment.

The present disclosure also contemplates a method for recommending vision correction parameters based on a user's prescription and demographic information. This method is described below with respect to FIG. 8.

Figure 6B:
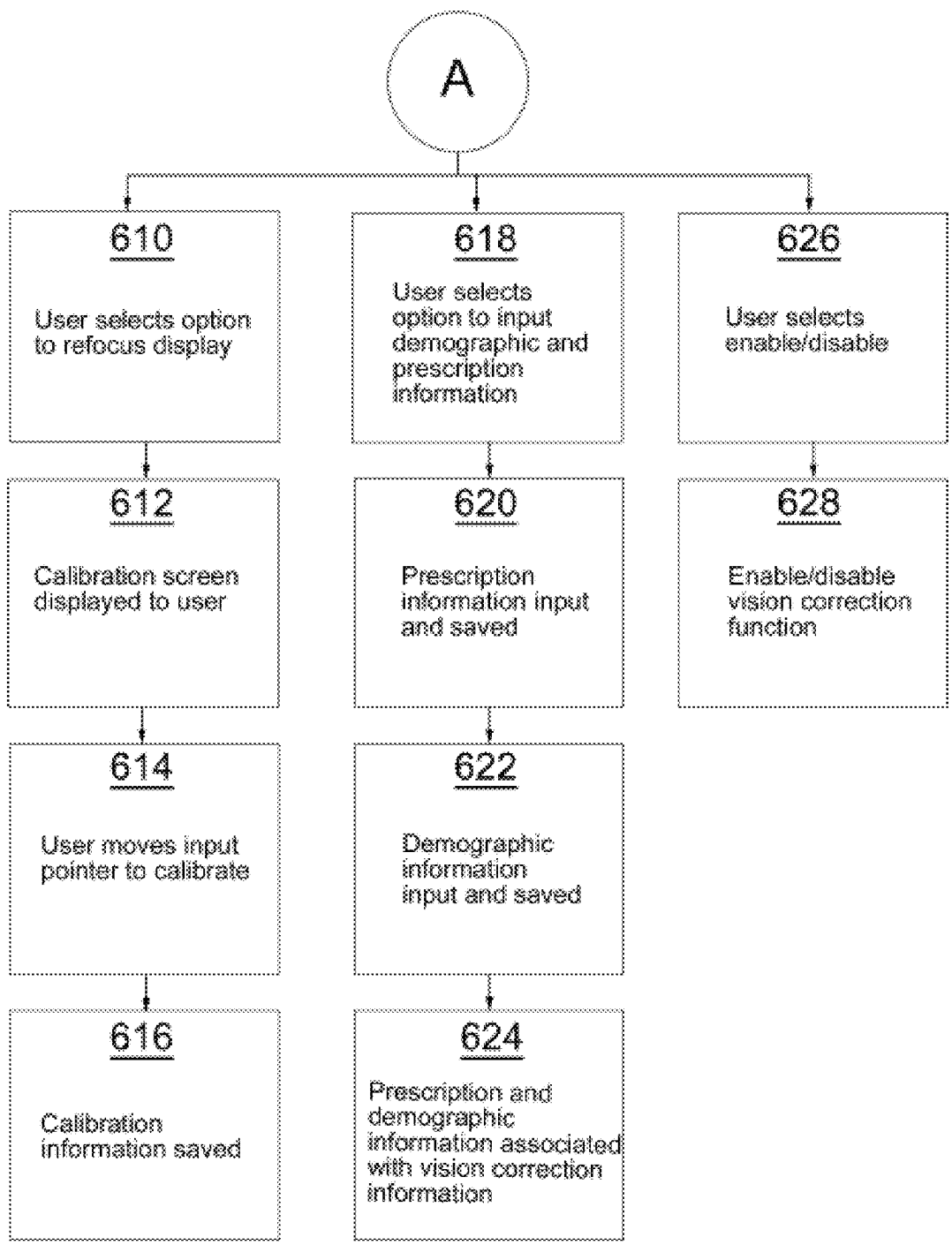
FIG. 6B is a flow chart continuing from the flow chart of FIG. 6a and showing various user options selectable through a graphical user interface rendered on the user's device and cooperatively implemented via the server-based vision correction system, in accordance with one embodiment.

In step 800, the user inputs prescription and demographic information as in steps 620 and 622 of the method of FIG. 6.

In step 802, the user's prescription and demographic information are sent to the external database.

In step 804, the external database computes recommended vision correction parameters based on the user's prescription and demographic information. The database computes these parameters using the vision correction parameters of other users with similar prescription and demographic information.

In step 806, the external database sends the recommended vision correction parameters to electronic device 100.

While the present disclosure describes various exemplary embodiments, the disclosure is not so limited. To the contrary, the disclosure is intended to cover various modifications and equivalent arrangements included within the general scope of the present disclosure.

What is claimed is:

1. An electronic device for use by a prescribed user having reduced visual acuity, the device comprising:
   a digital display;
   a hardware processor; and
   a non-transitory computer-readable medium having statements and instructions stored thereon for execution by said hardware processor in correcting an output image to be rendered by said digital display in accordance with a designated image correction, wherein said image correction function receives as input at least one designated user-specific vision correction parameter selected from a plurality of available correction parameters to correspond with the reduced visual acuity of the user and thereby output a correspondingly corrected output image;
   wherein output of said correspondingly corrected output image via said digital display at least partially compensates for the user's reduced visual acuity,
   wherein said digital display is a light-field display including a single digital output display screen and a light-field display optics layered thereon and defined by at least one light-field optics parameter so to concurrently produce a number of controllable angularly defined display views, and wherein said image correction function comprises an image pre-filtering function that receives as input said at least one light-field optics parameter and said at least one designated user-specific vision correction parameter to output said correspondingly corrected output image via said light-field display in accordance with said number of controllable angularly defined display views.

2. The electronic device of claim 1, wherein said non-transitory computer-readable medium has further statements and instructions stored thereon for execution by said hardware processor to implement and render an interactive graphical user interface (GUI) on said display, wherein said interactive GUI incorporates a dynamic vision correction scaling function that dynamically adjusts said at least one vision correction parameter in real-time in response to a designated user interaction therewith via said GUI.

3. The electronic device of claim 2, wherein said dynamic vision correction scaling function comprises a graphically rendered scaling function and wherein said designated user interaction comprises a continuous slide motion operation, and wherein said GUI is configured to capture and translate a user's given continuous slide motion operation to a corresponding adjustment to said vision correction parameter scalable with a degree of said user's given slide motion operation.

4. The electronic device of claim 3, wherein said graphically rendered scaling function comprises a substantially circular graphical scale and wherein said continuous slide motion operation consists of a substantially circular motion on said substantially circular graphical scale.

5. The electronic device of claim 1, further comprising a communication interface operable to communicate over a network with a network-accessible vision correction resource having stored in association therewith said plurality of available correction parameters and a user profile associated with the user;

wherein said user profile has stored in association therewith said at least one designated vision correction parameter; and wherein identification of said user profile is communicated by the electronic device to said network-accessible resource via said communication interface to access said at least one designated vision correction parameter therefrom.

6. The electronic device of claim 5, wherein said non-transitory computer-readable medium has further statements and instructions stored thereon that, when executed by said hardware processor, render a user login interface that receives as input user profile credentials and relays said user credentials to said network-accessible vision correction resource to access said at least one designated vision correction parameter therefrom, and wherein a given user profile is rendered accessible in response to a corresponding user login via two or more distinct electronic devices.

7. The electronic device of claim 5, wherein said at least one designated vision correction parameter is automatically calculated by a hardware processor associated with said network-accessible resource as a function of at least one user visual acuity factor input by the user via the electronic device and communicated to the network-accessible resource via said communication interface for storage against said user profile, wherein said user visual acuity factor comprises at least one of a user demographic and a predefined user vision correction prescription.

8. The electronic device of claim 1, wherein the device comprises a digital vehicle user interface, a digital watch, or a digital reader.

9. The electronic device of claim 1, wherein the device further comprises an onboard or remotely interfaceable digital camera operable to display an image captured by said camera on said digital display such that said captured image is automatically corrected in accordance with said vision correction function for consumption by the user via said digital display.

10. The electronic device of claim 1, wherein said non-transitory computer-readable medium has further statements and instructions stored thereon for execution by said hardware processor to implement and render an interactive graphical user interface (GUI) on said digital display, wherein said interactive GUI incorporates a vision toggle function that dynamically toggles responsive to user action between distinct predefined vision correction modes, and wherein said distinct predefined vision correction modes include a non-corrected mode.

11. The device of claim 1, wherein said light-field display optics comprises a parallax barrier.

12. The device of claim 1, wherein said light-field display optics comprises a lenslet array.

13. The device of claim 1, further comprising a front-facing camera, wherein a distance from said digital display and the user is calculated using information retrieved from said front-facing camera, and wherein said image pre-filtering function receives said distance as input to output said correspondingly corrected output image as a function thereof.

14. A non-transitory computer-readable medium having statements and instructions stored thereon for execution by a hardware processor to implement a vision correction application on an electronic device including a light-field display which comprises a single digital output display screen and a light-field display optics layered thereon and is defined by at least one light-field optics parameter, to at least partially compensate for a user's reduced visual acuity, said statements and instructions executable by said hardware processor to:

access at least one designated user vision correction parameter selected from a plurality of available correction parameters to correspond with the reduced visual acuity of the user;

correct an output image of the electronic device in accordance with a designated image correction function to output a correspondingly corrected output image via said single digital output display screen, wherein said image correction function comprises an image pre-filtering function that receives as input said at least one light-field optics parameter and said at least one designated user vision correction parameter so to concurrently produce a number of controllable angularly defined display views; and output said correspondingly corrected output image via said single digital output display screen and said light-field display optics layered thereon in accordance with said number of controllable angularly defined display views so to at least partially compensate for the user's reduced visual acuity.

15. The non-transitory computer-readable medium of claim 14, wherein said non-transitory computer-readable medium has further statements and instructions stored thereon for execution by said hardware processor to implement and render an interactive graphical user interface (GUI) on said digital output display screen, wherein said interactive GUI incorporates a dynamic vision correction scaling function that dynamically adjusts said at least one vision correction parameter in real-time in response to a designated user interaction therewith via said GUI, wherein said dynamic vision correction scaling function comprises a graphically rendered scaling function and wherein said designated user interaction comprises a continuous slide motion operation, and wherein said GUI is configured to capture and translate a user's given continuous slide motion operation to a corresponding adjustment to said vision correction parameter scalable with a degree of said user's given slide motion operation.

16. The non-transitory computer-readable medium of claim 14, wherein the non-transitory computer-readable medium further comprises statements and instructions to implement and render an interactive graphical user interface (GUI) on said digital output display screen, wherein said interactive GUI incorporates a vision toggle function that dynamically toggles responsive to user action between distinct predefined vision correction modes corresponding to distinct vision correction parameters, and wherein said distinct predefined vision correction modes include a non-corrected mode.

17. The non-transitory computer-readable medium of claim 14, wherein said non-transitory computer-readable medium further comprises statements and instructions to process an image captured by an onboard or remotely interfaceable camera such that said captured image is automatically corrected in accordance with said vision correction function for consumption by the user via said digital output display screen.

18. The non-transitory computer-readable medium of claim 14, wherein the non-transitory computer-readable medium further comprises statements and instructions operable to cause said hardware processor to access a display distance parameter representative of a distance between the user and the digital output display screen and execute said vision correction function as a function of said distance.

19. The non-transitory computer-readable medium of claim 18, wherein the non-transitory computer-readable medium is executable on distinct device types, and wherein said display distance parameter is predefined for each of said distinct device types.

20. A network-enabled vision correction system to implement vision correction on a plurality of electronic devices, each including a single digital output display screen, a hardware processor, a non-transitory computer-readable medium, and a communication interface, the system comprising:
 a network-accessible vision correction server including stored in association therewith a user profile for each system user, wherein each said user profile includes stored in association therewith a respective system user identifier and at least one respective vision correction parameter selected from a plurality of vision correction parameters to at least partially correspond with a reduced visual acuity of said respective system user;
 a software application executable on each of the devices, stored in the non-transitory computer-readable medium thereof, and comprising statements and instructions executable by the hardware processor thereof in correcting an output image to be rendered by the single digital output display screen thereof in accordance with a designated image correction function, wherein said image correction function receives as input said at least one vision correction parameter accessed from a given user profile as selected for a given system user, and thereby outputs a correspondingly corrected output image via said digital display to at least partially compensate for a reduced visual acuity of said given system user; and
 a light-field optics to be layered on the single digital output display screen of each of the devices, wherein said light-field optics is defined by at least one light-field optics parameter so to concurrently produce a number of controllable angularly defined display views, and wherein said image correction function is configured to account for said light-field optics parameter in correcting said output image in accordance with said number of controllable angularly defined display views.

21. The system of claim 20, wherein said at least one vision correction parameter is automatically calculated by a server-accessible hardware processor as a function of at least one user visual acuity factor input by the user via the electronic device and communicated to said server via the communication interface for storage against said user profile, wherein said user visual acuity factor comprises at least one of a user demographic and a predefined user vision correction prescription.

22. The system of claim 20, wherein said user profile is remotely accessible upon user identification from any of said electronic devices so to execute said correspondingly corrected output image via any of said electronic devices in response to said user identification.

23. The system of claim 20, wherein said electronic devices comprise any one or more of cellular telephones, smartphones, smart watches or other smart devices, an onboard vehicle navigation or entertainment system, or a network interfaceable vehicle dashboard and/or controls.

24. A network-enabled vision correction method to implement vision correction on a plurality of remote electronic devices, each having a single digital output display screen, a hardware processor, and a communication interface, the method comprising:
 providing access to a vision correction application executable on each of the remote electronic devices to correct an output image to be rendered by the single digital output display screen, wherein said single digital output display screen comprises a light-field display optics layered thereon and defined by at least one light-field optics parameter so to concurrently produce a number of controllable angularly defined display views, in accordance with a designated image correction function, wherein said image correction function comprises an image pre-filtering function that receives as input said at least one light-field optics parameter and at least one designated vision correction parameter corresponding with a respective reduced visual acuity;
 storing on a remote server a respective user profile for each of a plurality of registered users, and storing in association therewith said at least one designated vision correction parameter for each of said registered users and a respective digital user identifier usable in remotely identifying each of said registered users; and
 receiving at an application server over the network a given digital user identifier from a given registered user operating any given one of the remote electronic devices;

the application server:
identifying said given registered user against a corresponding stored user profile as a function of said given digital user identifier;
retrieving said at least one designated vision correction parameter stored in association therewith; and
transmitting said at least one designated vision correction parameter over the network to said given one of the remote electronic devices so to invoke execution of said designated image correction function thereon based at least in part on said at least one designated vision correction parameter and thereby output a correspondingly corrected output image via the single digital output display screen and said light-field display optics layered thereon in accordance with said number of controllable angularly defined display views to at least partially compensate for a reduced visual acuity of said given registered user.

25. The method of claim 24, wherein said vision correction application is further executable to graphically render a real-time vision correction adjustment interface that dynamically adjusts said at least one designated vision correction parameter in real-time responsive to user interaction with said interface in dynamically adjusting said corrected output image accordingly, and digitally record an adjusted vision correction parameter corresponding to a preferred corrected output image setting selected by said given registered user via said interface, wherein the method further comprises:
receiving over the network a vision correction parameter adjustment command at said application server from said given one of the remote electronic devices indicative of said adjusted vision correction parameter; and
storing said adjusted vision correction parameter against said given user profile.

* * * * *

UNITED STATES PATENT AND TRADEMARK OFFICE
CERTIFICATE OF CORRECTION

| | | |
|---|---|---|
| PATENT NO. | : 10,564,831 B2 | Page 1 of 1 |
| APPLICATION NO. | : 15/246255 | |
| DATED | : February 18, 2020 | |
| INVENTOR(S) | : Nathan L. Hough et al. | |

It is certified that error appears in the above-identified patent and that said Letters Patent is hereby corrected as shown below:

On the Title Page

On Page 2, Column 2, Item (56), Line 32, under Other publication, delete "fora" and insert --for a--.

In the Specification

In Column 6, Line 12, delete "user user" and insert --user--.

In the Claims

In Column 12, Line 55, Claim 1, delete "correction," and insert --correction function,--.

In Column 13, Line 17 (Approx.), Claim 2, after "(GUI) on said" insert --digital--.

In Column 14, Line 10, Claim 9, delete "vision" and insert --image--.

In Column 15, Line 31, Claim 17, delete "vision" and insert --image--.

In Column 15, Line 40, Claim 18, delete "vision" and insert --image--.

In Column 16, Line 4, Claim 20, delete "digital display" and insert --digital output display screen--.

Signed and Sealed this
Twenty-first Day of July, 2020

Andrei Iancu
*Director of the United States Patent and Trademark Office*